(12) United States Patent
Denner et al.

(10) Patent No.: US 12,539,969 B2
(45) Date of Patent: Feb. 3, 2026

(54) INTERACTIVE TRANSPORT PATH WITH SIMULTANEOUS METRICS VIEWER

(71) Applicant: VIASAT, INC., Carlsbad, CA (US)

(72) Inventors: Ryan C. Denner, San Marcos, CA (US); David B. Mcenroe, Dublin (IE); Gregory R. Jay, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 18/838,589

(22) PCT Filed: Feb. 15, 2022

(86) PCT No.: PCT/US2022/016497
§ 371 (c)(1),
(2) Date: Aug. 14, 2024

(87) PCT Pub. No.: WO2023/158423
PCT Pub. Date: Aug. 24, 2023

(65) Prior Publication Data
US 2025/0153847 A1 May 15, 2025

(51) Int. Cl.
*B64D 11/00* (2006.01)
*G06F 3/0354* (2013.01)
(Continued)

(52) U.S. Cl.
CPC ...... *B64D 11/0015* (2013.01); *G06F 3/03543* (2013.01); *G06F 3/0483* (2013.01);
(Continued)

(58) Field of Classification Search
CPC ... B64D 11/0015; G08G 5/21; G06F 3/03543; G06F 3/0483; G06T 11/001; G06T 11/60; G06T 2200/24
(Continued)

(56) References Cited

U.S. PATENT DOCUMENTS

2020/0005639 A1   1/2020  Walsh
2021/0183254 A1*  6/2021  Halsey ............... G08G 5/22

FOREIGN PATENT DOCUMENTS

EP    3628973 A1    4/2020
EP    4092652 A1   11/2022
(Continued)

*Primary Examiner* — Mark Edwards
(74) *Attorney, Agent, or Firm* — HOLZER PATEL DRENNAN

(57) ABSTRACT

In some implementations, a method for visualizing an interactive transport path including displaying, on a display device, a map viewer comprising a geographic area map. The method further includes displaying, in the geographic area map of the map viewer, one or more trip segment icons corresponding to one or more time intervals of a period of time of the trip. The method further includes displaying, on the display device, a transport metrics viewer having one or more viewer segment icons corresponding to the one or more time intervals of the period of time and corresponding to one or more viewer segments of the transport metrics viewer, each viewer segment icon having a viewer feature that represents a corresponding status of an onboard service provided during a corresponding time interval of the one or more time intervals of the period of time of the trip.

39 Claims, 13 Drawing Sheets

(51) Int. Cl.
  *G06F 3/0483* (2013.01)
  *G06T 11/00* (2006.01)
  *G06T 11/60* (2006.01)
  *G08G 5/21* (2025.01)

(52) U.S. Cl.
  CPC ............ *G06T 11/001* (2013.01); *G06T 11/60* (2013.01); *G08G 5/21* (2025.01); *G06T 2200/24* (2013.01)

(58) Field of Classification Search
  USPC ........................................................ 351/157
  See application file for complete search history.

(56) References Cited

FOREIGN PATENT DOCUMENTS

| | | | |
|---|---|---|---|
| WO | 2021086405 | A1 | 5/2021 |
| WO | 2022010524 | A1 | 1/2022 |

\* cited by examiner

INTERACTIVE TRANSPORT PATH WITH SIMULTANEOUS METRICS VIEWER

TECHNICAL FIELD

The present disclosure generally relates to mobile communications systems, and more specifically to monitoring the communications systems that provide onboard services on vessels such as aircrafts, trains, boats, cruisers, buses, and the like.

BACKGROUND

There are many Internet service providers on the market that provide commercial aviation data to customers. The aviation data may include information about onboard communications services available on commercial aircrafts. The onboard services may include various communications and entertainment services such as access to the Internet, computer-based entertainment, and the like. The commercial aviation data may be depicted in various graphical representations including graphical user interfaces (GUIs).

Most often, however, commercial aviation customers would like to view the information about aircraft onboard services at a high level of detail and granularity. For example, the customers would like to be provided with displays that are comprehensive, yet easy to glean. The customers also would like to be able to request, and receive, information about the status of onboard services at any point of a trip of the aircraft. The term "trip" or "transport path" herein refers to a flight, voyage, cruise, or excursion carried on by a vehicle. The terms vehicle and vessel are used herein interchangeably.

The customers also would like to know when, during the trip, the onboard services provided by the aircraft were up or down, what types of issues prevented the onboard services from being available on the aircraft, and the like.

Having that type of information available at their fingertips may be very important to the commercial aviation customers, especially to those who are responsible for making sure that the onboard services are available on the vehicles. The airline operators would want to know, for example, the state of the services at various points of the trip of the aircraft. In fact, in some situations, the operators would want to know the status of the onboard services on a minute-by-minute basis so that the operators can assess, and improve, the health of the onboard services provided by the aircraft flying over different regions, from different airports to different destinations, at different times, at different time zones, and the like.

Therefore, there is a need for improved methods and tools that allow to interactively monitor and visualize the status of onboard services provided on vehicles during the vehicles' trips, and more specifically that allow to interactively monitor/visualize the status of the onboard services during various parts of the trips of the vehicles.

SUMMARY

In some implementations, a method allows to interactively monitor and visualize graphical representations of status of onboard services provided on a vehicle during the vehicle's trip. More specifically, the method allows to visualize, in a GUI, the status of the onboard services provided by the vehicle during various parts and points of the trip. Stating differently, the approach provides an interactive GUI that allows visualizing quality of the onboard services provided during individual parts of the trip of the vehicle and allows interacting with the GUI to request providing detailed information about the quality of onboard services provided at individual points of the vehicle's trip. The information may be provided in real time or offline and may be provided to the crew of the vehicle as well as to the on-ground operators of the enterprise managing the vehicles. Different ways of determining the quality of the onboard services are described later.

Suppose that a vehicle (such as an airplane) took off from an airport in Los Angeles, CA, and flew to San Francisco, CA. However, as the plane reached 10,000 feet above the ground, the crew of the plane noticed that, for example, some of the onboard services, including inflight connectivity (IFC), had been impaired. The presented approach allows displaying a GUI that allows the crew to identify the points of the trip at which the connectivity was impaired, monitor the quality of the inflight connectivity services during the entire trip, and to interactively obtain more information about the services at any point of the trip.

The presented GUIs may be displayed in, for example, a plane cockpit for the plane's crew and may be used to visualize a transport path of the trip of the plane. As the plane continues flying toward the destination, the GUI may be used to provide detailed information about the services provided during any point and any part of the trip. The interactive GUI may also be displayed in control stations used by the on-ground operators of the airports and the airlines.

The interactive GUIs may be available online, i.e., in real time as the plane continues flying toward the destination, and offline, i.e., after the trip is completed.

In some implementations, the interactive GUI depicts an interactive transport path using a graphical representation of the path. The path may be represented using different colors, patterns, line shapes, and the like, to indicate quality of onboard services provided during the individual portions or points of the trip. For example, the segments of the trip during which the quality of onboard services was impaired may be color-coded using a red color, while the segments of the trip during which the quality of onboard services was good may be color-coded using a green color, and so on.

The status of onboard services provided during a trip may include aggregated information about onboard services provided during each trip segment of the trip. The aggregated information about onboard services provided during a corresponding trip segment may include aggregated information about an inflight entertainment (IFE) service, an inflight connectivity (IFC) service, an IFE session service, a Wi-Fi connectivity service, a Wi-Fi session service, a TV service, a TV session service, a data session service, a promotional session service, an email service, and/or a texting service.

The GUI presented herein may display an icon indicating a current position of the plane along the corresponding transport path. As a user hovers a pointing device, such as a cursor, over any part of the transport path, the icon indicating the current position of the plane may be updated and repositioned accordingly. For example, when the user moves the cursor to another location along the path, the GUI detects the corresponding hovering event, and in response thereto, the GUI repositions the icon to the new location along the path.

In addition to visualizing the current location of the plane along the path, the GUI may also display messages providing detailed information about the quality of onboard services at the locations along the path. Example messages are described later.

The interactive GUI may also depict one or more transport (e.g., flight) metrics viewers showing graphical representations of the individual types of onboard services. Each graphical representation of the services may be represented as a function of the time of the trip. Examples of the flight metrics viewers may include viewers depicting the IFE services, the IFC services, and the like.

Furthermore, the interactive GUI may depict a vertical bar positioned across the displayed flight metrics viewers. The bar may be represented as, for example, a vertical line positioned at a location along the path. The bar may be repositioned along the path as a user hovers using a pointing device over the path and moves the pointing device to a new location along the path. The bar allows the user to track the events occurring along the trip and visualize the quality of onboard services provided at the individual points of the trip.

One of the benefits of the provided interactive GUI is that the interface provides interactivity with the displayed information and allows a user to request information about quality of the onboard services provided at any point during the trip of the vehicle. The GUI may display, for example, messages indicating an outage event such as, for example, the airplane was out-of-coverage during a corresponding part of the trip, and therefore, the IFC services were unavailable onboard of the plane during that particular segment of the trip. The messages may also indicate the reasons for the outage event of the services and the events that might have impacted the quality of the services, such as out-of-coverage events, tail-blockage events, transmit-inhibit events, no aircraft data bus, and the like. The outage events are explained later.

Suppose that a GUI displays a particular flight metrics viewer that graphically represents quality of the IFC services provided during a trip by a vehicle. If the quality of the IFC services during a particular segment of the trip was poor, then an icon, depicted in the GUI to represent the corresponding trip segment, may be color-coded using, for example, a red color.

However, if the quality of IFC services during another segment of the trip was great, then an icon, depicted in the GUI to represent that trip segment, may be color-coded using, for example, a green color. The GUI may also display messages indicating, for example, the details of the quality of IFC services provided on the board of the plane during the corresponding segment of the trip. The GUI may also color-code and color-coordinate other icons and indicators of the GUI. The details are described later.

Some of the reasons for unavailability of onboard services on aircrafts may be predicated by the policies and rules imposed by the countries and their corresponding governments. For example, some governments have policies that set forth the rules as to whether airplanes flying over those countries' territories can transmit and receive data wirelessly. Information about those rules may be included in the interactive GUI presented herein to allow the users to determine the reasons for the impaired quality of the onboard services provided on the planes.

Some onboard services are unavailable on aircrafts once the aircrafts reach certain altitudes. The information about those rules may be also displayed in the GUI to allow the users to determine the reasons for the impaired quality of the onboard services.

In some implementations, an apparatus for visualizing an interactive transport path with service performance dependent features comprises a processor, memory in electronic communications with the processor, and instructions stored in the memory and executable by the processor to cause the processor to perform the steps of the method described herein.

In some implementations, one or more non-transitory computer-readable storage media stores one or more instructions for visualizing an interactive transport path with service performance dependent features. The instructions of the storage media may be stored in the memory and when executed by one or more processors, may cause the processors to perform the steps of the method described herein.

BRIEF DESCRIPTION OF THE DRAWINGS

A further understanding of the nature and benefits of the present approaches may be realized in reference to the following drawings. In the appended drawings, similar components or features may have the same reference label. Further, various components of the same type may be distinguished by following the reference label by a second label that distinguishes among the similar components.

In the drawings.

DETAILED DESCRIPTION

In the following description, for the purposes of explanation, numerous specific details are set forth in order to provide a thorough understanding of the methods described herein. It will be apparent, however, that the present approaches may be practiced without these specific details. In some instances, well-known structures and devices are shown in a block diagram form to avoid unnecessarily obscuring the present approaches.

The detailed description is organized below according to the following outline:
1.0. OVERVIEW
   1.1. INTERACTIVE TRANSPORT PATH WITH SERVICE PERFORMANCE DEPENDENT FEATURES
   1.2. INTERACTIVE FLIGHT METRICS VIEWERS WITH SERVICE PERFORMANCE DEPENDENT FEATURES
2.0. EXAMPLE COMMUNICATIONS SYSTEM FOR GENERATING AN INTERACTIVE PATH VIEWER AND FLIGHT METRICS VIEWERS
   2.1. COMMUNICATIONS SYSTEMS
   2.2. ON-GROUND SYSTEMS
   2.3. ONBOARD SYSTEMS
3.0. EXAMPLE INTERACTIVE TRANSPORT PATH VIEWER WITH SERVICE PERFORMANCE DEPENDENT FEATURES
4.0. EXAMPLE INTERACTIVE FLIGHT METRICS VIEWER WITH SERVICE PERFORMANCE DEPENDENT FEATURES
5.0. EXAMPLES OF HYBRID VIEWERS
6.0. FLOW CHARTS
   6.1. INTERACTIVE MAP VIEWER WITH SERVICE PERFORMANCE DEPENDENT FEATURES
   6.2. MAP VIEWER INTERACTIVITY
   6.3. INTERACTIVE FLIGHT METRICS VIEWERS WITH SERVICE PERFORMANCE DEPENDENT FEATURES
   6.4 FLIGHT METRICS VIEWER INTERACTIVITY
7.0. HARDWARE IMPLEMENTATION
8.0. GENERAL CONSIDERATIONS 1.0. Overview 1.1. Interactive Transport Path with Service Performance Dependent Features In some implementations, an approach provides an interactive GUI that allows visualizing, online and/or off-line, quality of onboard services provided during a trip of a vehicle and allows interacting with the GUI to request and receive detailed information and messages about the quality of onboard services provided at individual points of the vehicle's trip. The visualization of the onboard services may include generating and displaying a map viewer that depicts an interactive transport path corresponding to the vehicle's trip.

Figure 4A:
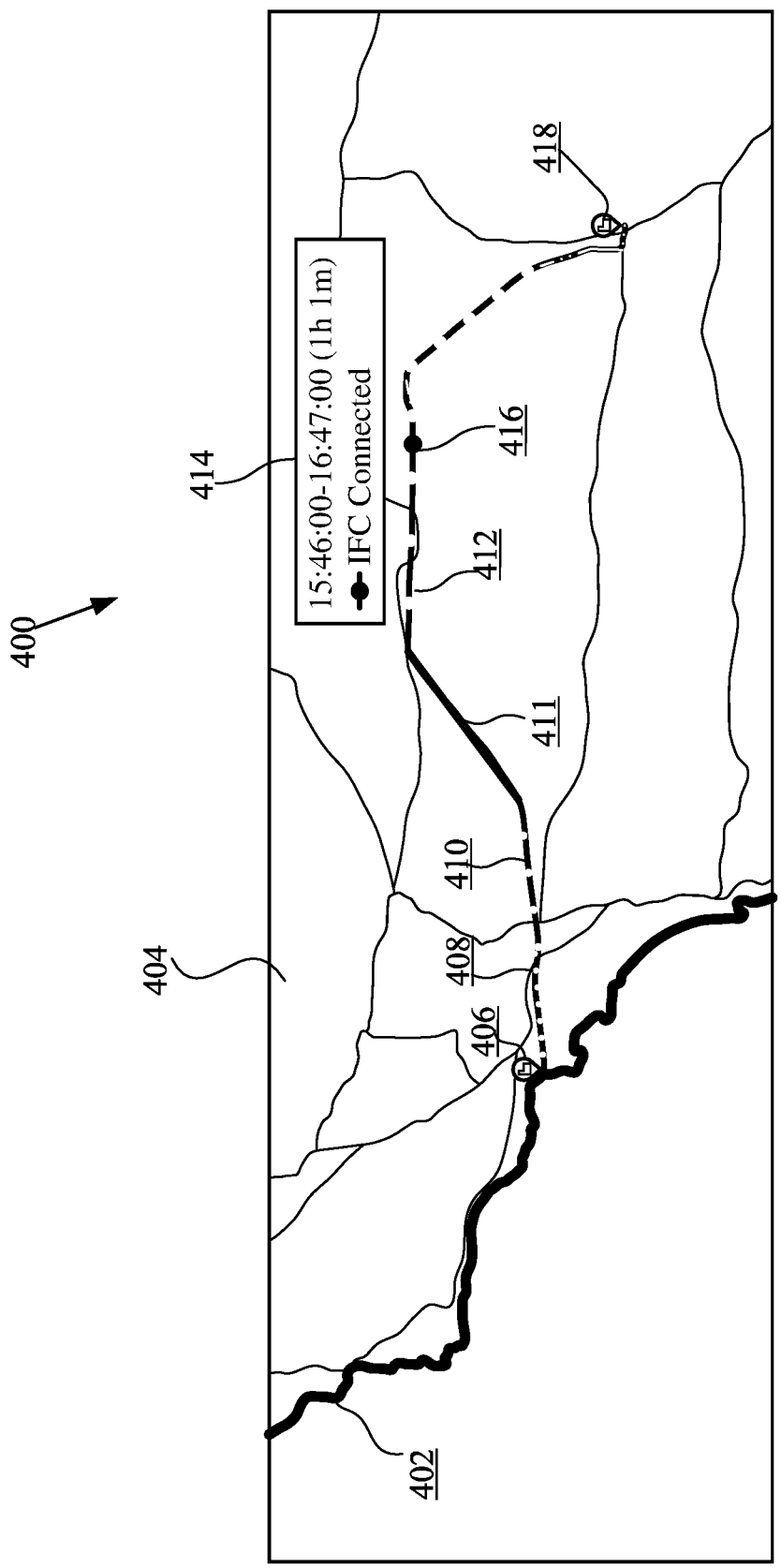
FIG. 4A is an example of a GUI depicting an interactive transport path viewer with service performance dependent features in accordance with one or more embodiments.

An example method for visualizing an interactive transport path with service performance dependent features may include displaying, on a display device, a GUI that includes a map viewer comprising a geographic area map. An example map viewer 404 is depicted in FIG. 4A, described later.

The example method may further include obtaining a flight path of a trip of a vehicle. The flight path of the trip of the vehicle may be depicted in the GUI and may have a trip start location and a trip end location. An example trip start location 406 and an example end location are depicted in FIG. 4A.

The flight path may comprise one or more trip segments depicted within the geographic area map. Each trip segment may have a corresponding trip segment start location and a corresponding trip segment end location. Each trip segment may be displayed as a segment overlay over the geographic area map.

Furthermore, the method may include obtaining corresponding status of an onboard service provided during each corresponding trip segment of the trip segments of the trip of the vehicle and obtaining a corresponding trip segment icon for each corresponding trip segment of the trip segments. Examples of trip segment icons 408, 410, 411, and 412 are depicted in the GUI of FIG. 4A.

Each trip segment icon may have a feature that represents the corresponding status of the onboard service provided during the corresponding trip segment. The feature may be represented using a shape, a color, a pattern, a shade, a dotted line, a broken line, or a color-pattern. For example, if the quality of IFC during a particular segment of the trip was poor, then a trip segment icon, depicted in the GUI to represent the particular trip segment of the trip, may be color-coded using, for example, a red color.

Each trip segment icon may be placed in the map viewer of the GUI according to the corresponding trip segment start location and the corresponding trip segment end location of the corresponding trip segment.

The corresponding status of an onboard service provided during the corresponding trip segment may include aggregated information about onboard services provided during the corresponding trip segment. The aggregated information about onboard services provided during the corresponding trip segment may include aggregated information about an inflight entertainment (IFE) service, an inflight connectivity (IFC) service, an IFE session service, and the like.

In some implementations, the method further includes obtaining a first indication of a first hovering event of a pointing device over a first trip segment icon displayed in the map viewer of the GUI. In response to obtaining the first indication of the first hovering event, a first message is displayed at a first location nearby the first trip segment icon in the map viewer. The first message may indicate a corresponding first status of onboard service provided during a first trip segment corresponding to the first trip segment icon. An example first message 414 is depicted in FIG. 4A.

The method may further include obtaining a second indication of a second hovering event of the pointing device over a second trip segment icon. In response to obtaining the second indication of the second hovering event, the first message is removed from the map viewer of the GUI, and a second message is displayed at a second location nearby the second trip segment icon in the map viewer. The second message may indicate, for example, a corresponding second status of onboard service provided during a second trip segment corresponding to the second trip segment icon.

Figure 4B:
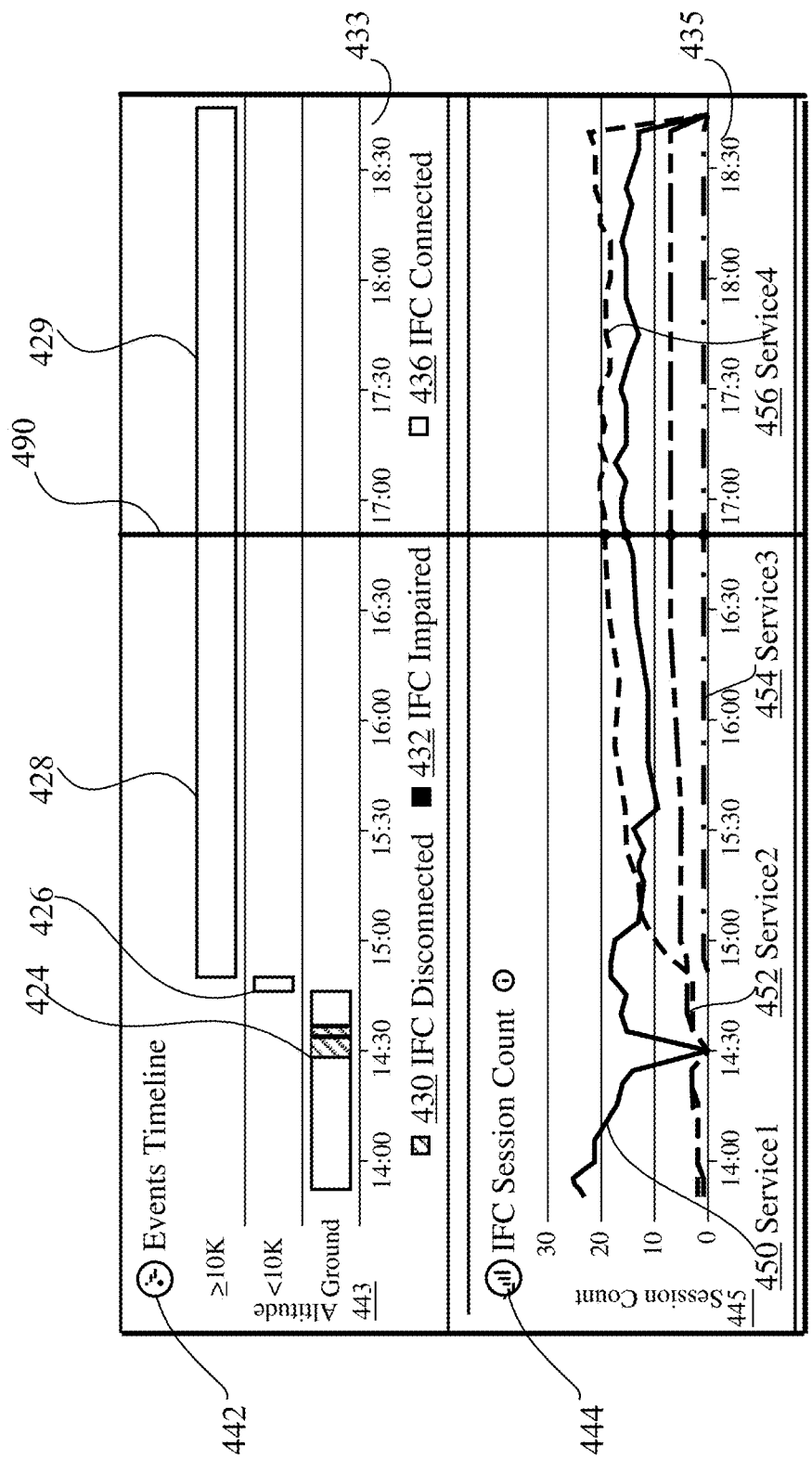
FIG. 4B is an example of a GUI depicting an interactive flight metrics viewer with service performance dependent features in accordance with one or more embodiments.
Figure 4C:
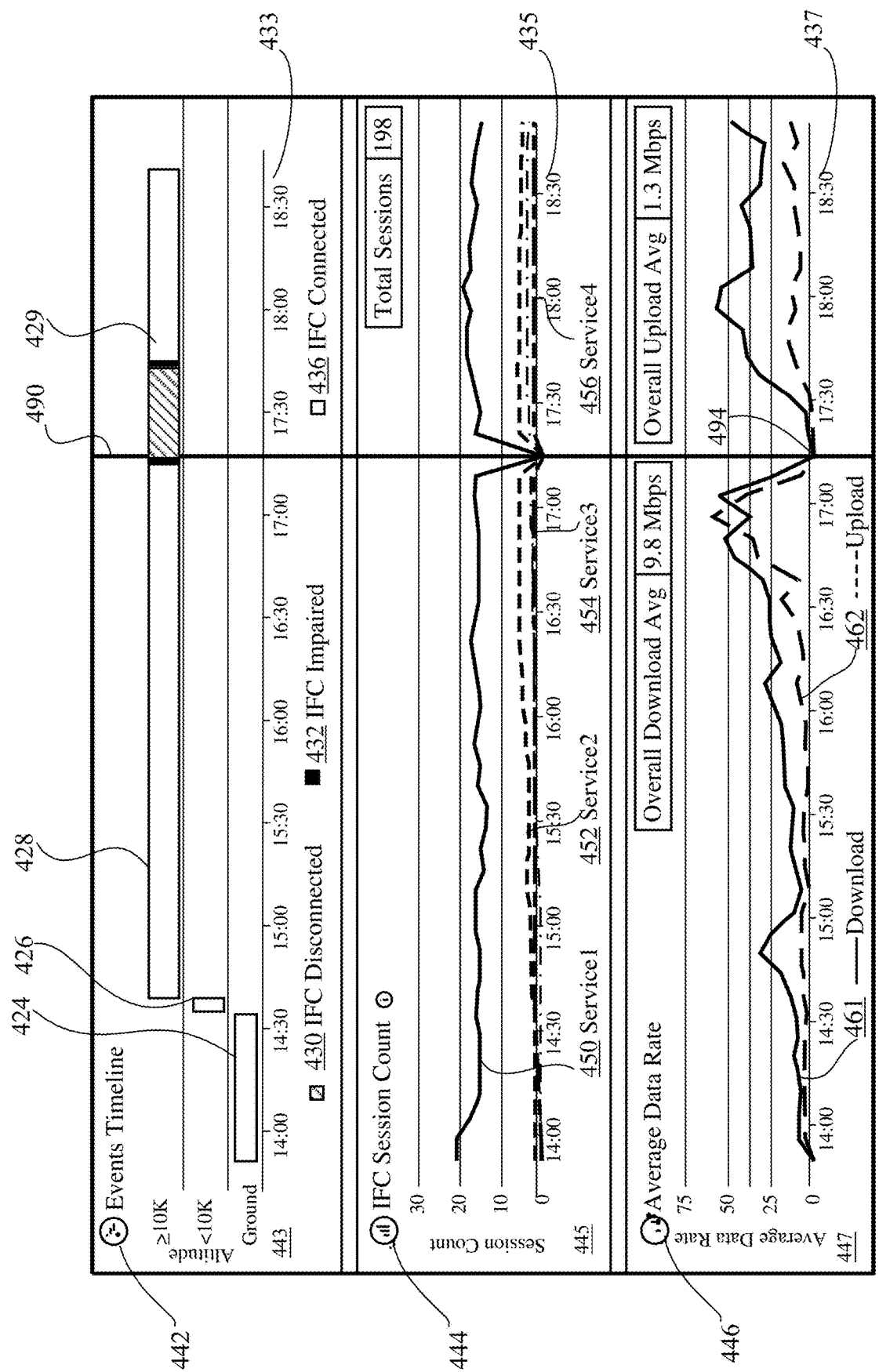
FIG. 4C is an example of a GUI depicting examples of interactive flight metrics viewers with service performance dependent features in accordance with one or more embodiments.
Figure 4D:
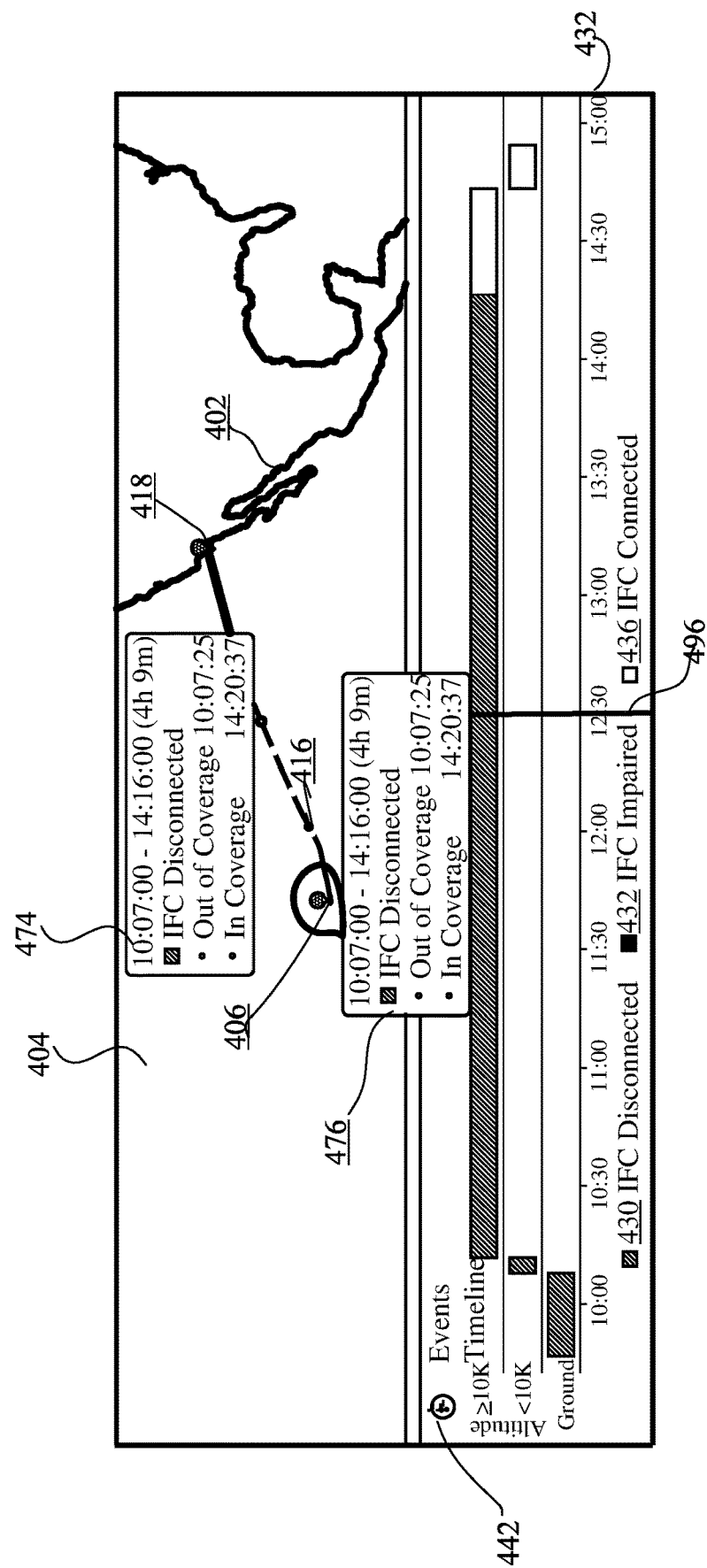
FIG. 4D is an example of a GUI depicting an example interactive transport flight path viewer and an example interactive flight metrics viewer with service performance dependent features in accordance with one or more embodiments.
Figure 4E:
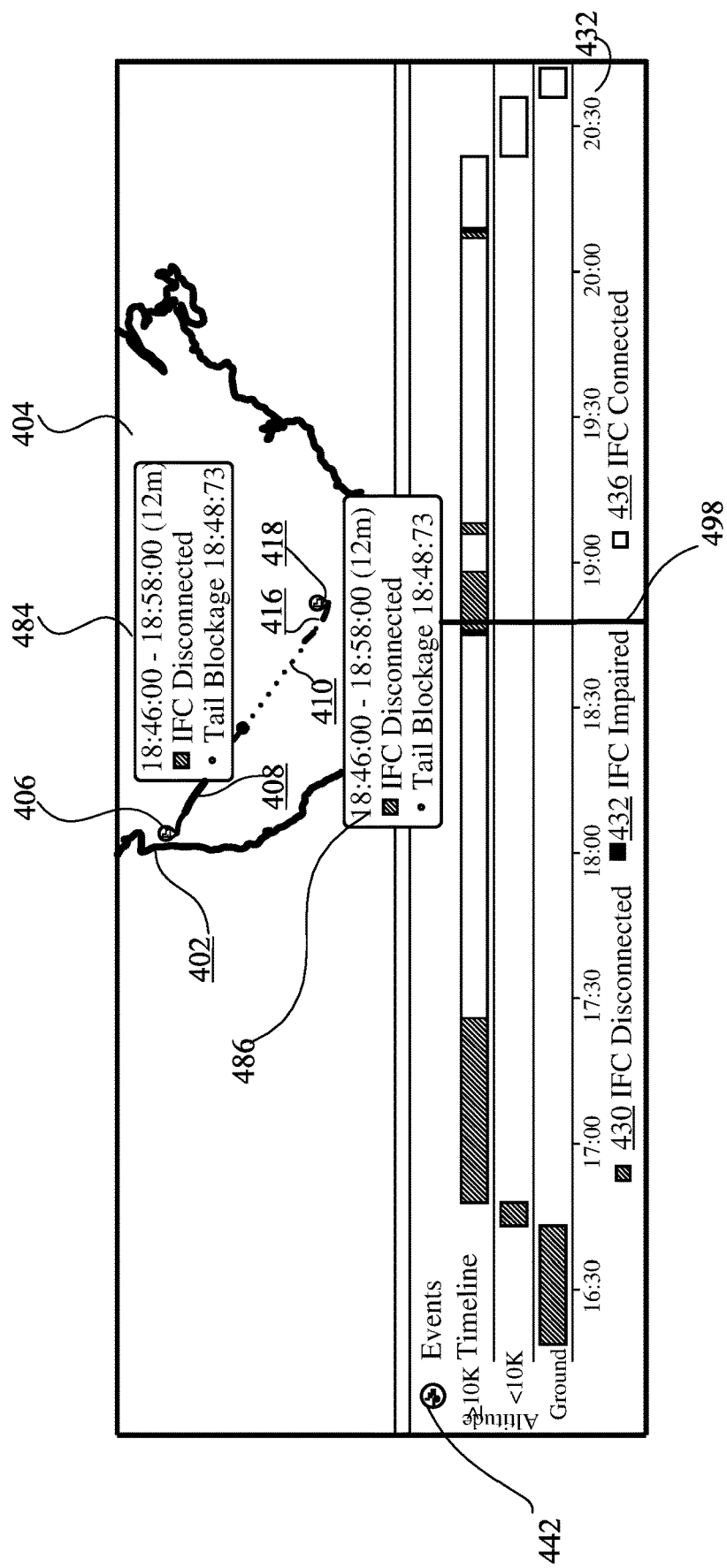
FIG. 4E is an example of a GUI depicting an example interactive transport flight path viewer and an example interactive flight metrics viewer with service performance dependent features in accordance with one or more embodiments.

1.2. Interactive Flight Metrics Viewers with Service Performance Dependent Features In some implementations, an approach provides an interactive GUI that allows visualizing the quality of individual types of onboard services provided during a trip of a vehicle and allows interacting with the GUI to request and receive detailed information about the quality of the individual onboard services provided at the individual points of the vehicle's trip. The visualization of the onboard services may include the visualization of interactive transport (e.g., flight)

metrics viewers that depict the quality of the individual onboard services provided during the trip. In addition to displaying the interactive transport metrics viewers, the approach may also include displaying the interactive map viewer, which was described before. An example map viewer 404 is depicted in FIG. 4A. Examples of flight metrics viewers 442-444 are depicted in FIGS. 4B-4C, and an example of flight metrics viewer 442 combined with map viewer 404 is depicted in FIGS. 4D-4E.

An example method for visualizing the interactive transport path and the flight metrics viewers with service performance dependent features comprises displaying, on a display device, a map viewer comprising a geographic area map.

The method may further include displaying, in the geographic area map of the map viewer of the GUI, one or more trip segment icons corresponding to trip segments of a flight path of a trip of a vehicle and corresponding to time intervals of the trip.

The method may also include displaying, on the display device, a flight metrics viewer having one or more viewer segment icons corresponding to the one or more time intervals of the trip and corresponding to one or more viewer segments of the flight metrics viewer. Examples of viewer segment icons of flight metrics viewer 442 include a viewer segment icon 424, a viewer segment icon 426, a viewer segment icon 428 and a viewer segment icon 429.

Each viewer segment icon may have a viewer feature that represents a corresponding status of an onboard service provided during a corresponding time interval of the one or more time intervals of the period of time of the trip. Examples of status are described later.

In some implementations, the method further includes obtaining an indication of a hovering event of a pointing device. The indication may specify that the pointing device is hovering over either a first trip segment icon of the trip segment icons of the map viewer or over a first viewer segment icon of the of the flight metrics viewer at a particular time of the trip.

In response to obtaining the indication of the hovering event, a first visual marker overlying, at the particular time, over the first trip segment icon corresponding to a first time interval including the particular time is displayed in the map viewer. An example of a first visual marker 416 is depicted in FIGS. 4A, 4D and 4F, and is represented as a dot.

Simultaneously with displaying the first visual marker in the map viewer, a second visual marker is displayed in the flight metrics viewer. The second visual marker is displayed as overlying, at the particular time, over the first viewer segment icon corresponding to the first time interval including the particular time. An example second visual marker 490 is depicted in FIGS. 4B-4C and is represented as a vertical bar. Additional examples include a second visual marker 496 in FIG. 4D and a second visual marker 498 in FIG. 4E. It should be noted that the scenarios depicted in FIG. 4A-4E are independent from each other and unrelated to each other.

Each of the first visual marker and the second visual marker may have one or more features such as a shape, a color, a pattern, a shade, or the like. For example, referring to FIG. 4A, first visual marker 416, i.e., a corresponding dot, may be color-coded using the same color as that used to color-code first trip segment icon 412 of the trip segment icons of the flight path depicted in map viewer 404. The same color or pattern may be used to color-code the corresponding first viewer segment icon of the viewer segment icons of the flight metrics viewer.

Furthermore, the method may include displaying a first message in the map viewer in response to obtaining the indication of the hovering event. The first message may be displayed as overlying over the first trip segment icon corresponding to the first time interval including the particular time. Moreover, the first message may indicate a corresponding first status of the onboard service provided at the particular time of the period of time of the trip of the vehicle. Further, the first message may include time information about the first time interval and the particular time. An example first message 476 is depicted in FIG. 4D and an example first message 486 is depicted in FIG. 4E.

The corresponding first status of the onboard service provided at the particular time of the period of time of the trip of the vehicle may include aggregated information about the onboard service provided at the particular time of the trip of the vehicle. Examples of the onboard services were described before.

Simultaneously with displaying the first visual marker in the map viewer, a second message may be displayed in the flight metrics viewer. The second message may be displayed as overlying over the first viewer segment icon corresponding to the first time interval including the particular time. The second message may indicate a corresponding second status of onboard service of a particular type and provided at the particular time of the period of time of the trip of the vehicle. The corresponding second status of onboard service of a particular type and provided at the particular time of the period of time of the trip of the vehicle may include aggregated information about the onboard service of a particular service type provided at the particular time of the trip of the vehicle.

In some implementations, the trip segment icons depicted in the map viewer may be color-coded using the colors that correspond to the corresponding ranges of quality of onboard communications services provided during one or more corresponding trip segments of the trip segments of the trip.

Furthermore, the viewer segment icons may be color-coded using the colors that correspond to the corresponding ranges of quality of onboard communications services provided during the corresponding trip segments of the trip segments of the trip. For example, a certain trip segment icon, of the one or more trip segment icons depicted in the map viewer, may be depicted using the same color as a corresponding viewer segment icon of the viewer segment icons of the flight metrics viewer.

In some implementations, in response to determining that the second visual marker is overlaid over a particular viewer segment icon depicted in the flight metrics viewer, the display device may increase a brightness of the color that is used to depict the particular viewer segment icon and decrease a brightness of the colors used to depict remaining viewer segment icons of the one or more viewer segment icons depicted in the flight metrics viewer.

2.0. Example Communications System for Generating an Interactive Path Viewer and Flight Metrics Viewers Various vehicles, such as aircrafts, boats, buses, etc., may be equipped with onboard systems configured to provide onboard communications services during the trips. The onboard services may be consumed by the passengers of the vehicles, the crew operating the vehicles, the on-ground operators managing the vehicle fleet, and the like. A user experience related to the consumption of the onboard services may be impacted by the performance of the communications servers and communications connections established between the vehicle, satellites, and on-ground systems.

Quality of onboard services provided by vehicles is often measured in terms of bandwidth, availability, reliability, usability, and speed. As the quality of the services provided by the vehicles increases, so does the satisfaction and enjoyment of the passengers and crew. However, providing high-quality onboard services often requires monitoring the services continuously and carefully, and solving the problems with the services quickly and efficiently.

To effectively monitor the onboard services, status, and metrics data specific to the services are collected and visualized to allow determining the problems in providing the onboard services by vehicles.

In some implementations, embodiments of the present disclosure provide for an interactive GUI that allows visualizing, online and/or off-line, quality of the onboard services provided during a trip of a vehicle and allows interacting with the GUI to request and receive detailed information and messages about quality of the onboard services provided at individual points of the vehicle's trip. The GUI may collect, display, and provide interactivity with the GUI data. Some of the GUI data may include status information of onboard services provided during the trip of the vehicle.

The terms "GUI data" and "interface data," as used herein, may refer to any data in a computer system that is related to the representation of one or more GUIs or portions thereof. GUI data may represent, for example, various graphical icons and/or other visual identifiers or features. Furthermore, the GUI data may include data or code providing instructions for generating or displaying/presenting various graphical icons and other visual identifiers and features on a display device.

GUI data may also refer to any type of user interface pages or portions of pages having any type of content. GUI data may refer, for example, to a page of a website, a page of a network-enabled application, or the like, or to any type of code used by a user interface to generate web pages, content pages, or interfaces. GUI data may comprise code conforming to any suitable or desirable language, such as hypertext markup language (HTML) code, Java or JavaScript code, Android code, iOS code, other embedded device operating system code, or the like.

Status information of onboard services provided during a trip may correspond to a performance indicator(s) of the onboard service(s) provided during the trip and may be represented in the GUI using icons, colors, shading, or other visual objects.

User input, such as a click, tap, hover, or the like, associated with an icon or other objects displayed in the GUI may trigger, or result in, the generation, provision, and/or presentation of GUI data related to a communications service provided on the vehicle and/or associated hardware devices with respect to trips carried on by the vehicle.

An icon may have one or more features, including, for example, visual features. Certain visual features of an icon may indicate a status level of communications services provided onboard of the vehicle. For example, if a user provides user input indicating a hovering event of the user's pointing device (e.g., a mouse) over a particular trip segment icon shown in a map viewer, a corresponding status of onboard services provided onboard during the corresponding particular trip segment may be obtained and provided to the GUI to be displayed in the GUI. By allowing for user input and interactions associated with the icons displayed in the GUI, the user may be able to access, for example, detailed information about various types of onboard services provided by the vehicle during the trip.

Vehicle data associated with a communications service provided on a vehicle may include any type of communications-service-related information associated with the vehicle. For example, vehicle data may indicate the service cases opened for the vehicle within a time period. Vehicle data may further provide information about communications-service hardware replacement or maintenance. Such information may provide insight as to whether the equipment replacement might have contributed to the communications service performance on the vehicle.

Trip data associated with a communications service provided during a trip may include any type of communication-service-related information associated with the trip. For example, trip data may indicate the passenger experience reporting events captured during the trip or the passenger experience reporting availability of the onboard services provided during the trip.

Status of a service type of onboard services provided by a vehicle may be represented in a variety of ways. For example, the status may be represented by a single value (e.g., a number), by a set of metrics values (e.g., a set of numbers), by a range of values, and the like. A single status value for a service type may be computed by aggregating different metrics data values determined for the service type provided by the vehicle during the trip. According to another example, the status of the network connectivity provided by a vehicle may be represented by a set of metrics values where each value is computed by aggregating the measures of the connections provided during the trip conducted by the vehicle within a time period.

Counts and types of service types of onboard services provided to passengers during trips may vary and depend on the implementation. Examples of communications service types may include network connectivity to the Internet and/or other networks. Examples of inflight entertainment service types may include a streaming TV service, an inflight entertainment service (providing access to content stored onboard such as movies and shows), and the like. The availability and utilization of the onboard services may be collected by computer servers installed, for example, in the vehicles. The servers installed in the vehicles may be referred to as onboard servers. The onboard servers may transmit the collected metrics data to one or more on-ground systems, which in turn, may process and aggregate the data, and display the aggregated data on display devices.

2.1. Communications Systems

In some implementations, the method presented herein may be implemented as part of a communications system. The communications system may include several components, and the components may collaborate with each other to determine, and provide, to an interactive GUI, status information of communications services provided during a trip of a vehicle. The components allow the GUI to visualize, for example, quality of onboard services provided during the trip of the vehicle and provide and receive detailed information about the quality of onboard services provided at individual points of the vehicle's trip.

Figure 1:
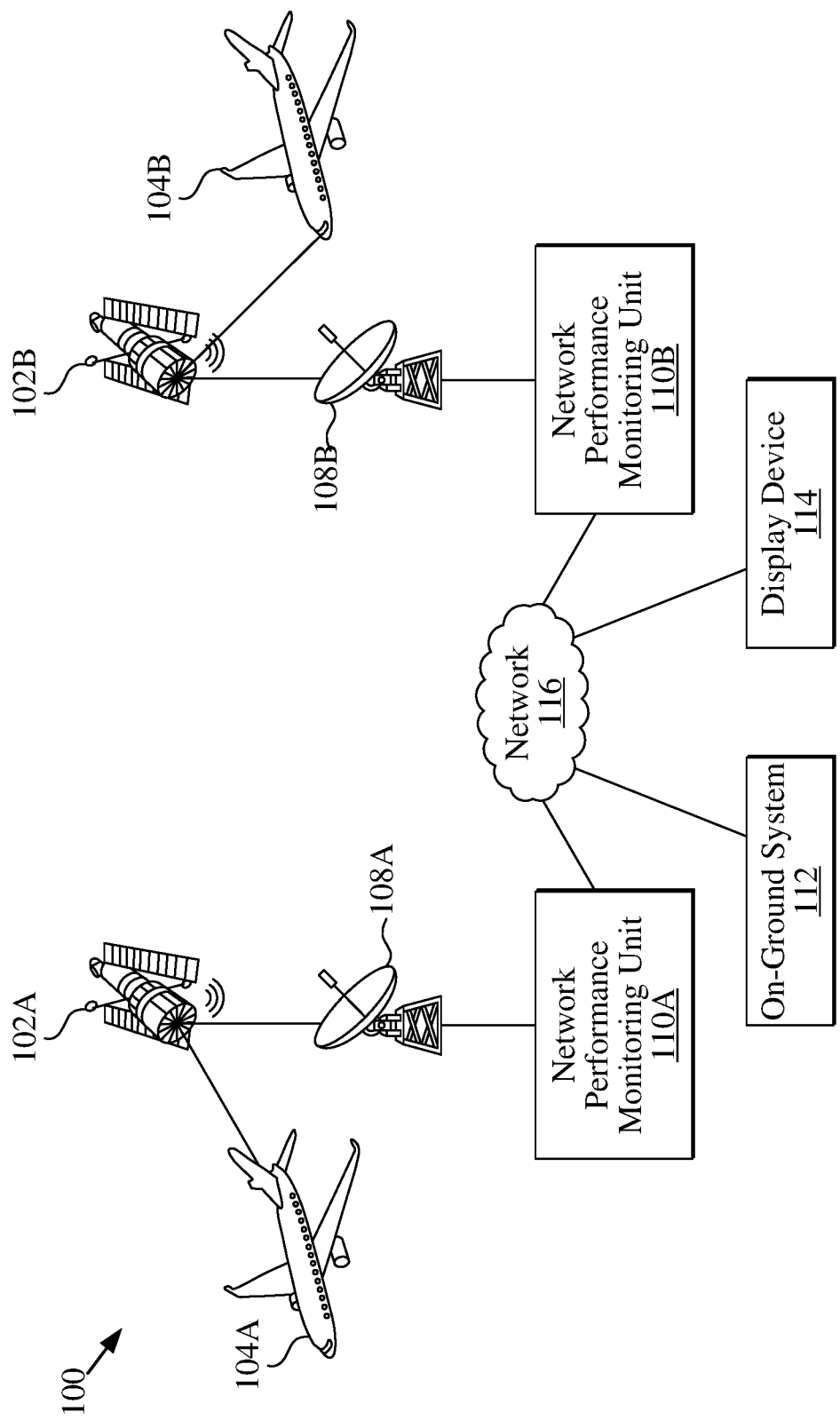
FIG. 1 is an example of a block diagram of a network communications system in accordance with one or more embodiments.

FIG. 1 is an example of a block diagram of a network communications system 100 in accordance with one or more embodiments. FIG. 1, the other drawing figures, and all of the description and claims in this disclosure are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In some implementations, communications system 100 comprises one or more communications satellites 102A-102B, one or more vehicles 104A-104B, one or more network gateways 108A-108B, one or more network performance monitoring units 110A-110B, one or more on-ground systems 112, one or more display devices 114, and one or more data communications network 116. Other embodiments may include fewer or more components.

In some implementations, communications system 100 supports two-way communications between vehicles 104A-104B, gateways 108A-108B, network performance units 110A-110B, communications network 116, on-ground systems 112, and potentially other components (not shown) of system 100 via an air-to-ground connectivity or otherwise.

Display devices 114 may be configured to display, for example, icons that visualize status of onboard services provided during a trip of a vehicle. For example, display device 114 may be configured to generate a GUI for presenting the icons graphically (using colors, shading, patterns, and the like) representing the onboard services provided during the trip.

Satellites 102A-102B may be configured to provide network communications connectivity to communications systems implemented in vehicles 104A-104B, including target devices implemented and/or present in vehicles 104A-104B. The target devices may be mobile devices that are operated by the crew and passengers of vehicles 104A-104B, and may include smartphones, tablets, iPods, laptops, PDAs, and the like. Satellites 102A-102B may, for example, facilitate network communications to and from the target devices to provide Internet access, TV shows, movies, data news feeds, and the like.

Vehicles 104A-104B may be mobile machines that are configured to carry passengers, crew members, and cargo, and to provide communications network connectivity and onboard services. Although FIG. 1 depicts vehicles 104A-104B as aircrafts, vehicles 104A-104B may include any type of vehicles, also including boats, trains, buses, automobiles, cruisers, and the like. Vehicles 104A-104B may be configured to provide onboard services such as access to the Internet, inflight entertainment, and the like.

In some implementations, vehicles 104A-104B include position determination device(s), such as an inertial measurement unit (IMU) or global positioning system (GPS). Such devices, if installed, may allow the vehicle to determine the vehicle's physical location. The location information may be utilized by on-ground system 112 in performing certain functionalities disclosed herein.

Other techniques for determining a vehicle's location may also be used. For example, in the embodiments in which satellites 102A-102B are spot beam satellites, vehicles 104A-104B may be able to derive their locations based on the spot beams being used to communicate with the satellite network 116.

In some implementations, vehicles 104A-104B may transmit their location information to on-ground system 112. The location information may be associated with vehicle-specific metrics that are collected near or at the reported position. This may allow on-ground system 112 to correlate particular vehicle-specific metrics with specific network service areas based on the associated location of the vehicle.

Location data for one or more of vehicles 104A-104B may be obtained by on-ground system 112 from a separate entity or a server not shown in the diagram of FIG. 1. Such an entity or server may receive location data from the vehicle(s) or otherwise derive the location data in some manner.

Vehicles 104A-104B may include onboard computer systems and sensor systems configured to collect and monitor metrics data about various events reflecting the quality of the onboard services. The metrics data may include information about availability and utilization of network connectivity and/or inflight entertainment services available on vehicles 104A-104B. The events may include receiving requests for the Internet connections, data communications sessions, downloading TV programs from content providers, downloading movies from the onboard movie content servers, and the like.

The metrics data collected by the onboard servers of vehicles 104A-104B may include, for example, the metrics showing availability and utilization of the network connectivity and inflight services on individual vehicles, individual trips, and/or individual portions of the trips. The metrics data may also include web browsing scores, video streaming scores, customer satisfaction scores, and the like. The metrics data may include upload speed metrics, download speed metrics, latency metrics, and the like.

The collected metrics data may be transmitted from the onboard servers of vehicles 104A-104B to on-ground systems 112 and/or network performance monitoring units 110A-110B. The metrics data may be transmitted via, for example, network gateways 108A-108B.

Network performance monitoring units 110A-110B may be configured to collect metrics data of onboard service provided on vehicles 104A-104B. The metrics data may be collected by network performance monitoring units 110A-110B themselves, by satellites 102A-102B, and/or by vehicles 104A-104B. The metrics data may be processed by any of monitoring units 110A-110B, on-ground systems 112, satellites 102A-102B, and/or vehicles 104A-104B.

On-ground systems 112 may be configured to process the collected metrics data, aggregate the data, and use the data to generate, for example, a map viewer and flight metrics viewers for visualizing performance indicators of onboard services provided during the trip of the vehicle. The viewers may be used by the crew of the vehicle, operators of the vehicle control centers, fleet operators, service providers, and vendors to allow them to assess the quality of the onboard services provided during the trips carried on by the vehicle or vehicles.

On-ground systems 112 may include one or more electronic hardware computers or components, including control circuitry configured to perform certain functionalities discussed in detail below.

Network gateways 108A-108B may be computer-based systems configured to perform the functionalities of communications modems. The functionalities may include modulation and demodulation of signals communicated between satellites 102A-102B and network performance monitoring units 110A-110B. The functionalities may also include packet queuing, packet acceleration and deceleration, network address translation (NAT), firewall-based security, periodic pinging, and other signal processing functionalities.

Communications network 116 may be implemented as any type of communications network or a group of communications networks. Network 116 may be configured to provide support for a variety of communications protocols, including broadband protocols, wireless protocols, and the like. Network 116 may support two-way communications between gateways 108A-108B, monitoring units 110A-110B, on-ground systems 112, display devices 114, and other computer systems and servers (not shown) implemented in system 100.

2.2. On-Ground Systems

In some embodiment, a method for visualizing quality of onboard services provided during a trip of a vehicle and providing requested detailed information about the quality of the onboard services provided at individual points of the vehicle's trip is implemented in one or more on-ground systems. The performance indicators of the onboard services may be visualized using a GUI configured to generate and display, for example, a map viewer and flight metrics viewers depicting status information of communications services provided during the trip.

Figure 2:
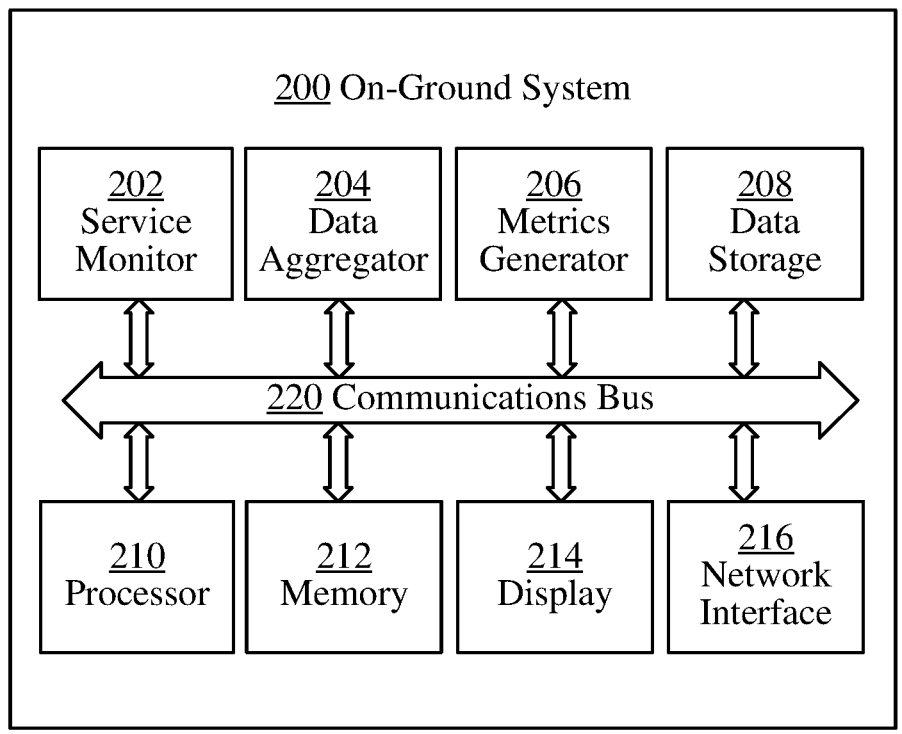
FIG. 2 is an example of a block diagram of an on-ground server in accordance with one or more embodiments.

FIG. 2 is an example of a block diagram of an on-ground server 200 in accordance with one or more embodiments. On-ground system 200 may be, for example, on-ground system 112 described in FIG. 1. On-ground system 200 may be implemented in a computer server or a network of computer servers, such as cloud-based systems and/or virtual compute nodes.

In some implementations, on-ground system 200 comprises a single hardware computer contained within a single physical enclosure, while in other embodiments, on-ground system 200 is implemented in a plurality of computer installed in multiple physical enclosures, some of which are within a single physical enclosure and others are geographically distributed away from each other. The functionalities described with respect to on-ground system 200 can be distributed among the components of the system 100 of FIG. 1 in a different manner than shown or described herein.

In some implementations, on-ground system 200 is configured to collect, monitor, aggregate, and otherwise process metrics data indicating performance of one or more service types of onboard service provided in vehicles. On-ground system 200 may be configured to use the collected and processed information to generate, for example, a map viewer and flight metrics viewers used to visualize performance indicators of onboard services provided during the trip.

On-ground system 200 may be configured to obtain, for example, a vehicle identifier of the vehicle for which onboard service is to be collected and monitored and status information for the trips carried by the vehicle. On-ground system 200 may also receive requests for obtaining status information of onboard services provided during a particular part or point of the trip.

On-ground system 200 may obtain the vehicle identifier using a variety of techniques. For example, on-ground system 200 may request the vehicle identifier from a vehicle control center of the vehicle fleet and store the identifier in a storage device of on-ground system 200.

On-ground system 200 may use the vehicle identifier as, for example, search keys in queries issued by the on-ground system to request metrics data about the onboard service provided on the corresponding vehicle. For example, on-ground system 200 may use a vehicle identifier as a search key in a query issued to an onboard server installed in vehicle 104A (shown in FIG. 1) to request metrics data about onboard service provided by vehicle 104A within a particular time period of at a particular point in time of the trip.

In other implementations, the metric data about the onboard service provided on the vehicle is automatically provided by the onboard systems implemented in the vehicles themselves or obtained from on-ground network performance monitoring units, or in conjunction with the onboard systems implemented in the vehicle and the on-ground network performance monitoring units.

In some implementations, on-ground system 200 comprises one or more service monitors 202, one or more data aggregators 204, one or more performance metrics generators 206, and one or more data storage units 208. System 200 may also include one or more processors 210, one or more memory units 212, one or more display devices 214, and one or more network interface cards 216. The components of on-ground system 200 may communicate with each other directly or indirectly via a communications bus 220. Other embodiments may include fewer or more components.

Display devices 214 may be configured to display visualizations of status of onboard services provided during a trip of a vehicle. The visualized status of the onboard services may be represented using, for example, trip segment icons, flight metrics segment icons, and the like. Examples of the icons were described before.

Display device 214 may be configured to generate a GUI for displaying the viewers in a concise and communicative form. The viewers may indicate the status of onboard service provided on the trips using the icons having different colors, shadings, patterns, and the like.

Display 214 may be implemented as an electronic display, such as a CRT display, LCD display, touchscreen, mobile device screen, and the like.

Service monitor 202 may be configured to collect metrics data about various service types of onboard service provided in vehicles, shown in FIG. 1. The events may include receiving requests for Internet connections, data communications sessions, TV programs downloads from content providers, movies downloads from the onboard movie content servers, and the like. The events may also include receiving indications that an Internet connection was or was not available in a vehicle at a given time, that a data communications session was or was not successfully opened or closed, that a movie was or was not successfully downloaded to a target device operated by the vehicle, and the like. Metrics data about the events may be collected as the passengers aboard the vehicle, as the vehicle travels, as the vehicle reaches its destination, and/or as the passengers depart the vehicle.

In some implementations, data aggregator 204 generates an average, maximum, minimum, mean, and/or median of two or more communications service performance metrics for a communications service provided on a vehicle for at least one trip of the vehicle. Data aggregator 204 may determine negative variances between communication service performance metrics of a vehicle being monitored as it proceeds along its travel route. The negative variances may themselves be aggregated to produce summary metrics representing a difference in performance of a communications service of the monitored vehicle compared to certain performance targets. This may provide threshold values/metrics for evaluating communication service performance. In some implementations, aggregation of negative variances may be divided by the duration of the given trip to the present point to provide an average negative variance experienced during the trip.

Data aggregator 204 may be configured to process, sort, and aggregate the collected and monitored metrics data. Processed data may be sorted and/or aggregated based on service types, vehicle identifiers, fleet identifiers, airline identifiers, airport identifiers, and the like. The type of processing performed on the data may depend on a variety of factors. For example, if the data pertains to a trip that a vehicle has already completed, then the data may be aggregated based on a type of the data, a type of service that the data represents, a source that provided the data, and the like. However, if the data pertains to an ongoing trip, then the processing may include selecting, from the collected data, the most recently received data reflecting the current-up-to-date availability and utilization of the onboard services.

Metrics generator 206 may be configured to use the sorted and aggregated information to determine performance metrics for determining status for the services provided to passengers while onboard the vehicle. The performance metrics may indicate, for example, the performance of one or more service types of onboard services provided on individual vehicles, individual trips, and/or individual portions of the trips.

Metrics generator 206 may also be configured to encode the sorted and aggregated data into corresponding status indicators to reflect the performance provided in vehicles. In some implementations, metrics generator 206 determines the status of one or more service types of onboard services provided on selected vehicles. The status of the service type may be determined based on metrics data collected for the service type provided on the selected vehicles and may include information about the service characteristics of the services provided to the passengers.

The status of a particular service type may, for example, correspond to a value (or a range of values) of the service metrics determined for the particular onboard service. The status may be associated with one or more icons to be displayed in, for example, a map viewer, flight metrics viewers, messages, and the like. Some of the features in, for example, messages may be represented numerically using, for example, a single number or a set of metrics values. A single number status for a particular onboard service may be computed as an aggregation of the service metrics data collected for the particular onboard service during a certain time period. A set of metrics values for a particular onboard service may include values determined for the particular onboard service during the trip.

Other features may be represented graphically using, for example, graphical elements such as icons having certain colors, patterns, and the like. A graphical feature for a particular onboard service may correspond to a value or a range of values determined based on the corresponding service metrics for the particular onboard service and may be depicted using a certain icon having a certain color or pattern that graphically represents the corresponding value or the corresponding value-range of the corresponding onboard service.

In some implementations, the status may be determined by metrics generator 206 itself. Alternatively, the status may be provided by satellites 102A-102B, vehicles 104A-104B, network gateways 108A-108B, and/or performance monitoring units 110A-110B, shown in FIG. 1.

Service metrics may be stored in data storage 208. Alternatively, or in addition to, the information and the metrics may be communicated to computer servers, such as other on-ground systems 200, and/or computer servers installed in on-ground systems 200. The status and the metrics may be used to generate, for example, a GUI presented herein.

Processors 210 may be configured to provide the execution environment for performing various system-based functions and for performing the methods described herein. Processors 210 may be configured to provide, for example, support for executing an operating system and system functionalities implemented in on-ground system 200.

Memory units 212 may include random access memory (RAM) and read-only memory (ROM) units. Memory 212 may be used to store operating system instructions and computer-readable and computer-executable instructions for implementing the methods described herein.

Network interface card 216 may be configured to facilitate communications between on-ground system 200 and vehicles, satellites, network monitoring stations, vehicle control centers, vehicle operator centers, vendor centers, and the like. The interface may be implemented in hardware, software and/or a combination thereof, and may be implemented to support various communications protocols, including wireless communications protocols, broadband communications protocols, and the like. Network interface 216 may be also used to provide connectivity with input devices (not shown) configured in on-ground system 200. The input devices may include keyboards, smartphones, touchscreens, audio devices, and the like, and may be used to provide inputs, requests for service performance information of onboard services, and the like.

In some implementations, on-ground system 200 comprises a web server (not shown in FIG. 2). The web server may be a single server or may represent a distributed network of servers across a geographic area. The web server may store instructions for generating and displaying a web-based user interface. The web-based user interface may allow a user to provide user input for configuring one or more threshold values or other performance target data discussed herein. Additionally, the web-based user interface may provide GUI data representing values for the metrics collected by the systems/components described herein. The web server may further be configured to generate and/or provide GUI data to one or more remote or local monitoring systems for generating a display and/or presentation to a user. The web server may receive indications of user input in connection with a GUI. Generation of the GUI data may be triggered by the user input indications, as described in detail later.

In some implementations, a web server may provide web page data to the one or more vehicles 104A-104B (shown in FIG. 1) and metrics data collected by data aggregator 204 (shown in FIG. 2). The aggregated metrics may indicate, for example, a number of seconds required, at vehicles 104A-104B, to load the web page data provided by the web server.

Web page and/or website content may be copied to, and/or served at, a web server. In this way, communications service performance metrics may be representative of performance of the communications network communicatively connecting on-ground system 200 (shown in FIG. 2) and the monitored vehicle and may not be affected by performance issues that may affect transfer of content from the origin server (e.g., the server that created the website).

2.3. Onboard Systems

In some implementations, a method for visualizing quality of onboard services provided during a trip of a vehicle and providing requested detailed information about the quality of the onboard services provided at individual points of the vehicle's trip is implemented and installed in the vehicles themselves.

In some implementations, onboard servers installed in vehicles are used to collect service metrics data for the service type(s) of onboard services provided on the vehicles and to transmit the collected metrics data from the onboard servers to the on-ground servers, which in turn, use the received metrics data to determine the status of each service type to generate, for example, a map viewer and flight metrics viewers.

Figure 3:
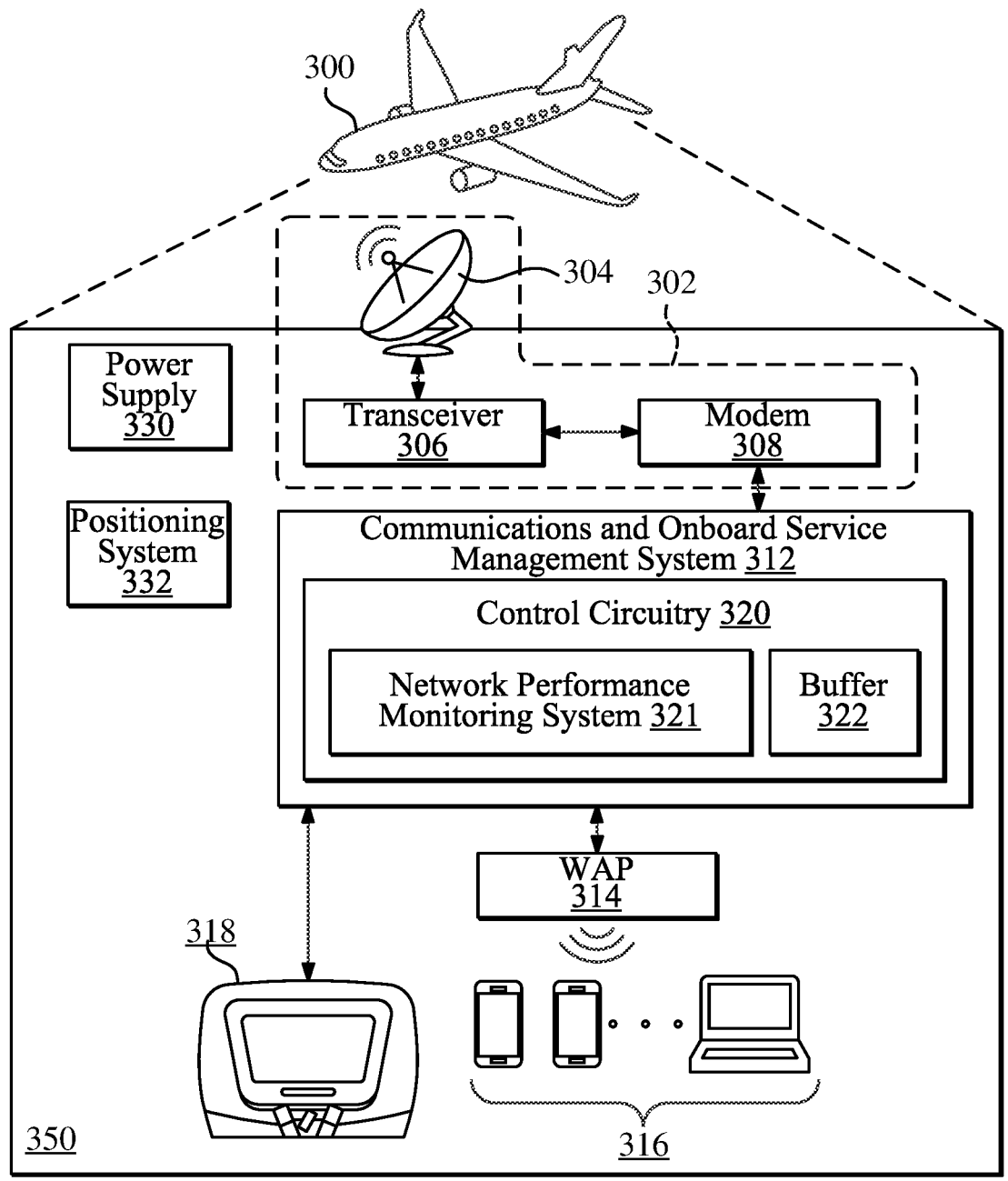
FIG. 3 is an example block diagram of an onboard system in accordance with one or more embodiments.

FIG. 3 is an example block diagram of an onboard system in accordance with one or more embodiments. The example depicted in FIG. 3 shows a vehicle 300 which is an aircraft; however, in other embodiments, vehicle 300 may correspond to a helicopter, cruise ship, bus, train, boat, and the like. To provide simple examples, it is assumed that vehicle 300 depicted in FIG. 3 corresponds to any vehicle 104A-104B shown in FIG. 1.

In some implementations, vehicle 300 comprises an onboard system 350. Onboard system 350 may be configured to collect metrics data of the service type(s) of onboard services provided on vehicle 300. Onboard system 350 may be also configured to transmit the collected metrics data to on-ground system, such as on-ground system 200 shown in FIG. 2. The collected metrics data may be associated with a unique identifier of vehicle 300 by the onboard system 350, and/or by the on-ground network performance monitoring unit of the onboard system. The unique identifier of the vehicle is also referred to herein as a vehicle identifier or a vehicle ID.

If vehicle 300 corresponds to an aircraft, then the identifier may include an aircraft tail identifier (ID), a nose ID, an aircraft serial number, or the like. The identifier may be configured, or hard-coded, in a computer system implemented in vehicle 300. Additional information associated with the vehicle may include a trip number such as a flight number, a travel segment number such as a route number, crew identifiers of crew members of vehicle 300, equipment identifiers such as serial numbers of antennas or network devices, an origination terminal identifier, a destination terminal identifier, a scheduled departure time, a scheduled arrival time, and the like.

In some implementations, vehicle 300 includes various hardware components, software components, and/or combinations thereof. For example, vehicle 300 may include one or more antennas 304, one or more transceivers 306, one or more modems 308, a communications and onboard service management system 312, one or more wireless access points ("WAPs") 314, as well as one or more onboard media client applications implemented in one or more personal target devices 316, and/or one or more passenger seatback media systems 318. Vehicle 300 is also equipped with a power supply unit 330 and a positioning system 332.

Antenna 304, transceiver 306, and modem 308 may be collectively referred to as a two-way communications system 302. System 302 may be configured to facilitate bidirectional communications with satellites, such as satellites 102A-102B shown in FIG. 1.

Communications system 302 may be configured to support bidirectional data communications between communications networks such as the Internet, and target devices 316, seatback media systems 318, positioning system 332, and the like. For example, system 302 may be configured to provide uplink data received from target devices 316 and/or seatback systems 318 to modem 308 to allow generating modulated uplink data in the form of a transmit intermediate frequency (IF) signal. System 302 may also support the reception of a forward downlink signal from a satellite (or other system such as an air-to-ground system) and the transmission of a return uplink signal back to the satellite (or other system such as an air-to-ground system) to support the bidirectional communications.

Antenna 304 may be configured to communicate signals between vehicle 300 and satellites or other systems (not shown in FIG. 3). The signals may be communicated via one or more communications links (not shown). Antenna 304 may be mounted to an elevation and azimuth gimbal which points antenna 304 toward the satellite and allows actively tracking the satellite.

Modem 308 may be implemented as a separate component, as shown in FIG. 3, or may be integrated with network performance monitoring system 321 of communications and onboard service management system 312. Modem 308 may be configured to generate modulated uplink data based on the uplink data received from communications and onboard service management system 312. The modulated IF signal may be delivered to transceiver 306.

Transceiver 306 may be configured to convert and then amplify the modulated uplink data to generate a return uplink signal and transmit the amplified signal via antenna system 304 to one or more satellites. Transceiver 306 may be also configured to receive, via antenna system 304, a forward downlink signal from the satellites. Transceiver 306 may, for example, amplify and down-convert the forward downlink signal and generate modulated downlink data, such as a receive IF signal, to be then demodulated by modem 308. The demodulated downlink data may be then provided from modem 308 to communications and onboard service management system 312 for routing to target devices 316 and/or seatback systems 318.

Target devices 316 may include smartphones, laptops, tablets, iPods, PDAs, netbooks, and the like, that have been brought onto vehicle 300 by passengers and crew members. Target devices 316 and/or seatback systems 318 may communicate with communications and onboard service management system 312 via communication links (not shown) which may be wired and/or wireless. The communications links may be part of a local area network (LAN) or a wireless area network (WLAN) supported by WAPs 314. WAPs 314 may be installed in various locations of vehicle 300 and may be configured to provide the traffic switching and routing functionalities.

Positioning system 332 may include Global Positioning System (GPS) circuitry configured to determine a present location or position of vehicle 300. Positioning system 332 may receive positioning information from sensors installed throughout vehicle 300. The position information may include readings of altitude, longitude, latitude, elapsed distance from an origination terminal, and the like. In some implementations, each position reading is associated with a corresponding time value corresponding to the time at which vehicle 300 was at a particular position, and at which the particular position value was recorded.

3.0. Example Interactive Transport Path Viewer with Service Performance Dependent Features In the context of the present approach, a trip is an aircraft's trip for which an interactive transport path viewer with service performance dependent features is generated and displayed using a GUI. The viewer may be generated automatically when a user requests information about the onboard service performance provided during the trip as the trip is either in progress or completed. The viewer may also be generated offline after the trip is completed.

In some implementations, once a user launches and executes the software application configured to generate an interactive transport path viewer, the system implementing the present approach may generate a GUI to display an interactive map viewer that shows a graphical representation of the transport path. The trip segments may be represented using corresponding icons representing the quality of the onboard services provided during the corresponding portions or points of the trip.

FIG. 4A is an example of a GUI depicting an interactive transport path viewer 400 with service performance dependent features in accordance with one or more embodiments. The depicted example shows a map viewer 404 that comprises a geographic area map. In the example of FIG. 4A, only a left boundary 402 of the geographic map is shown; other boundaries of the geographic map are omitted. In fact, several other details of the map that are not essential to the present approach, such as names of the airports, names of the roads, and the like, have been omitted in the examples shown in the included figures.

Referring again to FIG. 4A, map viewer 404 shows a flight path of a trip of a vehicle. Merely for the purpose of illustrating a simple example, suppose that the vehicle took off from Phoenix, AR, and is heading toward Los Angeles, CA. In this example, the flight path of the trip starts at a trip starting point 418 (that corresponds to the Phoenix airport) and ends at a trip ending point 406 (that corresponds to the Los Angeles airport).

The flight path may include one or more trip segments shown in map viewer 404. The trip segments may be represented in map viewer 404 using corresponding trip segment icons 408, 410, 411, and 412. Each trip segment icon of trip segment icons 408, 410, 411, and 412 is placed according to the corresponding trip segment start location and the corresponding trip segment end location of the corresponding trip segment. The current, or selected, location along the path is indicated using a location icon 416.

Each trip segment icon may have a feature that represents the corresponding status of the onboard service provided during the corresponding trip segment. The corresponding status of an onboard service provided during the corresponding trip segment may include aggregated information about the onboard services provided during the corresponding trip segment. Examples of the aggregated information were described before.

The status of the onboard service may be provided by, for example, on-ground system 200 described in FIG. 2, which corresponds to on-ground system 112 described in FIG. 1. Alternatively, although in rare situations, the information may be provided by an onboard system, such as onboard system 350 described in FIG. 3.

An on-ground system may be configured to collect, monitor, aggregate, and otherwise process metrics data indicating one or more service types of onboard service provided in vehicles. The on-ground system may be configured to use the collected and processed information to determine visual appearance of, for example, trip segment icons 408, 410, 411, and 412 to visualize the quality of the onboard services provided during the corresponding trip segments of the trip.

Referring again to FIG. 2, on-ground system 200, comprising service monitors 202, data aggregators 204, performance metrics generators 206, and data storage units 208, may use service monitors 202 to collect metrics data about various service types of onboard service provided in the vehicles. Service monitors 202 may receive, for example, requests for Internet connections, data communications sessions, TV programs downloads from content providers, movies downloads from the onboard movie content servers, and the like. Data aggregators 204 may be configured to generate an average, maximum, minimum, mean, and/or median of two or more communications service performance metrics for a communications service provided on a vehicle for the trips performed by the vehicle. Data aggregators 204 may also process, sort, and aggregate the collected and monitored metrics data. Processed data may be sorted and/or aggregated based on service types, vehicle identifiers, fleet identifiers, airline identifiers, airport identifiers, and the like. Metrics generators 206 may use the sorted and aggregated information to determine performance metrics for determining status for the services provided to passengers while onboard the vehicle. The performance metrics may be used to determine, for example, the features of trip segment icons 408, 410, 411, and 412.

In some implementations, the features that represent the corresponding status of the onboard service provided during the corresponding trip segment are represented in the trip segment icons using colors, shapes, patterns, shades, dotted lines, broken lines, color patterns, and the like. The different colors, shapes, and the like are used to differentiate the various levels of the quality of the onboard services provided during the corresponding trip segments.

In the example depicted in FIG. 4A, trip segment icons 408, 410, 411, and 412 are represented using different line types. More specifically trip segment icon 408 is represented using a short broken line, trip segment icon 410 is represented using a medium broken line, trip segment 411 is represented using a continuous line, trip segment icon 412 is represented using a long broken line, and the like. It should be noted that the scenarios depicted in FIG. 4A-4E are independent from each other and unrelated to each other.

Map viewer 404 provides interactivity capabilities that allow a user to request and obtain additional information about the quality of onboard services provided at a particular point along the trip. Suppose that, using map viewer 404 of FIG. 4A, the user hovered a pointing device (such as a mouse, and the like) over trip segment icon 412 at a point 416. Hovering the pointing device over point 416 may cause the GUI to generate a corresponding hovering event. In response to obtaining the indication of the hovering event, the GUI causes collecting content for a message 414 and displays message 414 in map viewer 404 at a location nearby point 416.

Message 414 may include various types of information. In the example shown in FIG. 4A, message 414 indicates a corresponding status of onboard service provided during a trip segment corresponding to trip segment icon 412 at point 416. The information may be very helpful to the plane's crew as the vehicle continues with its trip, as well as to the operators working at an on-ground operating station at the airport.

Icon 416 may have an associated location, an associated time, and one or more associated features. Some of the associated features of icon 416 include a shape, a color, and the like. In the example depicted in FIG. 4A, icon 416 is depicted as a black, large dot.

If a user moves the pointing device to a different point (not shown in FIG. 4A), the GUI may obtain an indication of another hovering event of the pointing device, and subsequently, the GUI may cause collecting content for another message and display that message (not shown in FIG. 4A) to indicate the corresponding status of onboard service provided at the new point of the trip. As the new message is displayed, the previous message is removed from map viewer 404 if necessary.

In other implementations, map viewer 404 may be arranged differently than shown in FIG. 4A and may depict the information in the forms that are different from those shown in FIG. 4A.

4.0. Example Interactive Flight Metrics Viewer with Service Performance Dependent Features FIG. 4B is an example of a GUI depicting an interactive flight metrics viewer with service performance dependent features in accordance with one or more embodiments. The depicted example shows an events timeline viewer 442 and an IFC session count viewer 444.

Furthermore, the depicted example shows a vertical marker (i.e., a bar) 490. Vertical marker 490 indicates a point in time for which a user requested detailed information about the onboard services provided by the vehicle. Vertical marker 490 is depicted as overlayed over events timeline viewer 442 and IFC session count viewer 444.

A user may reposition the vertical marker by hovering the user's pointing device (e.g., a mouse) over a different location along any viewer 442/444. Once the user repositions the vertical marker to the different location, the corresponding status information of the onboard services provided at the corresponding time point is displayed and visualized for the user.

Example events timeline viewer 442 shows a plurality of viewer segment icons 424, 426, 428, and 429. The viewer segment icons correspond to trip segments of a transport path of a trip of a vehicle. Furthermore, the viewer segment icons correspond to time intervals of the trip.

Each viewer segment icon has one or more viewer features that represent a corresponding status of an onboard service provided during the corresponding time interval along a timeline 433 of the trip. The viewer segment icons are depicted according to the altitude range 443 of the vehicles. Altitude range 443 is shown on the left side of the viewer.

Events timeline viewer 442 also includes a legend that provides that the status of IFC being disconnected is depicted in viewer 442 using a hash-crossed pattern 430, the status of IFC being impaired is depicted using a black color 432, and the status of IFC being connected is depicted using a white color 436.

In events timeline viewer 442, according to timeline 433, viewer segment icon 424 corresponds to a trip segment that started at about 13:50 and ended at 14:45. Viewer segment icon 424 shows that during that time period the IFC services were connected until about 14:28, then the IFC services were disconnected for a couple of minutes, then the IFC services were impaired, but came back at about 4:34. Viewer segment icon 426 corresponds to a trip segment that started at about 14:45 and ended at 14:47. Viewer segment icon 426 shows that during that time period the IFC services were connected. Viewer segment icon 428 corresponds to a trip segment that started at about 14:47 and ended at 16:40. Viewer segment icon 428 shows that during that time period the IFC services were connected. Viewer segment icon 429 corresponds to a trip segment that started at about 16:40 and ended at 18:40. Viewer segment icon 429 shows that during that time period the IFC services were connected.

Example IFC session count viewer 444 shows a plurality of viewer segment icons organized in a group 450 (corresponding to a first service), a group 452 (corresponding to a second service), a group 454 (corresponding to a third service), and a group 456 (corresponding to a fourth service). Each group corresponds to a different type of onboard services provided during the trip of the vehicle. Each group represents the status of the corresponding onboard services from, according to a timeline 435, about 13:50 to 18:40. The shape of the corresponding group representation represents a corresponding status of an onboard service provided during the corresponding time interval along a timeline 435 of the trip. The viewer segment icons are depicted according to the session count 445 depicted on the left side of the viewer.

Example IFC session count viewer 444 also includes a legend that provides that the status of the first service 450 is represented using a continuous line, the status of the second service 452 is represented using a long broken line, the status of the third service 454 is represented using a line-and-dot line, and the status of the fourth service 456 is represented a short broken line.

FIG. 4C is an example of a GUI depicting examples of interactive flight metrics viewers with service performance dependent features in accordance with one or more embodiments. The depicted example shows events timeline viewer 442, an IFC session count viewer 444, and an average data rate viewer 446. The details pertaining to viewers 442-444 have been described in FIG. 4B. The difference between FIG. 4C and FIG. 4B is that FIG. 4C also shows average data rate viewer 446, while FIG. 4B does not.

The depicted example also shows a vertical marker (i.e., a bar) 490. Vertical marker 490 indicates a point in time for which a user requested detailed information about the onboard services provided by the vehicle. Vertical marker 490 is depicted as overlayed over viewers 442, 444, and 446. As shown in FIG. 4C, it appears that the onboard services at the location indicated by vertical marker 490 were impaired.

A user may reposition the vertical marker by hovering the user's pointing device (e.g., a mouse) over a different location along any viewer 442/444/446. Once the user repositions the vertical marker to the different location, the corresponding status information of the onboard services provided at the corresponding time point is displayed and visualized in the GUI.

Example average data rate viewer 446 shows a plurality of viewer segment icons organized in a group 461 (corresponding to a download rate), and a group 462 (corresponding to an upload rate). Group 461 represents the download rate of the onboard services provided during the trip of the vehicle, while group 462 represents the upload rate of the onboard services provided during the trip of the vehicle. Each of the groups represents the status of the corresponding onboard services from, according to a timeline 437, about 13:50 to 18:40. The shape of the corresponding group represents a corresponding status of an onboard service provided during the corresponding time interval along a timeline 437 of the trip. The viewer segment icons are depicted according to a download rate 446 shown on the left side of the viewer and an upload rate (not shown in FIG. 4C).

Example average data rate viewer 446 also includes a legend that provides that the status of download rate 461 is represented using a continuous line, while the status of upload rate 462 is represented using a long broken line.

5.0. Examples of Hybrid Viewers

FIG. 4D is an example of a GUI depicting an example interactive transport flight path viewer and an example interactive flight metrics viewer with service performance dependent features in accordance with one or more embodiments. In the depicted example, the GUI shows map viewer 404 and events timeline viewer 442. Both viewers 404 and 442 have been described above. It should be noted that the scenario depicted in FIG. 4D is independent from the scenario depicted in FIG. 4A.

It should be noted, however, that the example depicted in FIG. 4D pertains to a trip that starts from starting point 418 located on a continent, and it ends at destination airport 406 located on an island. The large portion of the trip between starting point 418 and destination airport 418 is over a body of water. It happens frequently that onboard communications services provided by an airplane when the plane flies over a large body of water are impaired. Indeed, in the example shown in FIG. 4D and as further described, IFC onboard services appear to be impaired when the plane flies over the water.

The depicted example also shows a vertical marker (i.e., a vertical bar) 496. Vertical marker 496 indicates a point in time along a timeline 432 for which a user requested detailed information about the onboard services provided by the vehicle. Vertical marker 496 is depicted as overlayed over viewer 442.

A user may reposition the vertical marker by hovering the user's pointing device (e.g., a mouse) over a different location within viewer 442. Once the user repositions the vertical marker to the different location, the corresponding status information of the onboard services provided at the corresponding time point is displayed and visualized in viewer 442.

As shown in FIG. 4C, it appears that the IFC onboard service at the location indicated by vertical marker 496 was impaired. In fact, event timeline viewer 442 indicates that the IFC onboard services were impaired for some time. Therefore, the GUI may display one or more messages that would provide additional information about the impaired services. The messages may, for example, explain the reasons for the impaired services during the particular trip segment. The messages may explain, for example, that the services were impaired because the vehicle was in the area that was out-of-service, or because the tail of the vehicle was blocking the signals used to communicate with IFC onboard services to and from the vehicle, or because the transmit-inhibiting event for transmitting the services occurred during the particular segment of the trip, or the like.

Example messages include a message 474 and a message 476. Message 474 is displayed in map viewer 404 and indicates that the out of coverage in IFC onboard services started at 10:07 and lasted at least until 14:16. It also indicates that the IFC services became available at about 14:20. Message 476 is displayed in event timeline viewer 442 and indicates pretty much the same information as message 474.

In other examples and implementations, the messages may include different information and may be presented using different formats.

FIG. 4E is an example of a GUI depicting an example interactive transport flight path viewer and examples interactive flight metrics viewer with service performance dependent features in accordance with one or more embodiments. In the depicted example, the GUI shows map viewer 404 and events timeline viewer 442. Both viewers 404 and 442 have been described above. It should be noted that the scenario depicted in FIG. 4E is independent from the scenario depicted in FIG. 4A.

It should be noted that the example depicted in FIG. 4E pertains to a trip that starts at airport 418 and ends at destination airport 406. Both airports are located on the same continent. However, suppose that a plane flying from airport 418 toward destination airport 406 needs to fly over a desert. Indeed, in the example shown in FIG. 4E, a large portion of the trip from airport 418 to destination airport 418 is over the desert. It happens frequently that onboard communications services on an airplane when the plane flies over a desert are impaired. Indeed, in the example shown in FIG. 4E and as further described, IFC onboard services appear to be impairs as the plane flies over the desert.

The depicted example also shows a vertical marker (i.e., a vertical bar) 498. Vertical marker 498 indicates a point in time along timeline 432 for which a user requested detailed information about the onboard services provided by the vehicle. Vertical marker 498 is depicted as overlayed over viewer 442.

A user may reposition the vertical marker by hovering the user's pointing device (e.g., a mouse) over a different location within viewer 442. Once the user repositions the vertical marker to the different location, the corresponding status information of the onboard services provided at the corresponding time point is displayed and visualized.

As shown in FIG. 4E, it appears that the IFC onboard service at the location indicated by vertical marker 498 was impaired. In fact, since event timeline viewer 442 indicates that the IFC onboard services was, according to a timeline 432, impaired for some time, the GUI may display one or more messages that would provide additional information about the impaired services. The messages may, for example, explain the reasons for the impaired services during a particular trip segment. The services may have been impaired because the vehicle was in the area that was out-of-service, or because the tail of the vehicle was blocking the signals used to communicate with IFC onboard services to and from the vehicle, or because the transmit-inhibiting event occurred during the particular segment of the trip, or the like.

Example messages include a message 484 and a message 486. Message 484 is displayed in map viewer 404 and indicates that the IFC services were disconnected because of a tail blockage from 18:46 to about 18:58. It also indicates that the IFC services at the requested time of 18:48:73 were blocked because the tail of the plane blocked the incoming and outcoming IFC signals. Message 486 is displayed in event timeline viewer 442 and indicates pretty much the same information as message 484.

In other examples and implementations, the messages may include different information and may be presented using different formats.

6.0. Flow Charts

With respect to the various methods and processes disclosed herein, although certain orders of operations or steps are illustrated and/or described, it should be understood that the various steps and operations shown and described may be performed in any suitable or desirable temporal order. Furthermore, any of the illustrated and/or described operations or steps may be omitted from any given method or process, and the illustrated/described methods and processes may include additional operations or steps not explicitly illustrated or described.

6.1. Interactive Map Viewer with Service Performance Dependent Features

Figure 5A:
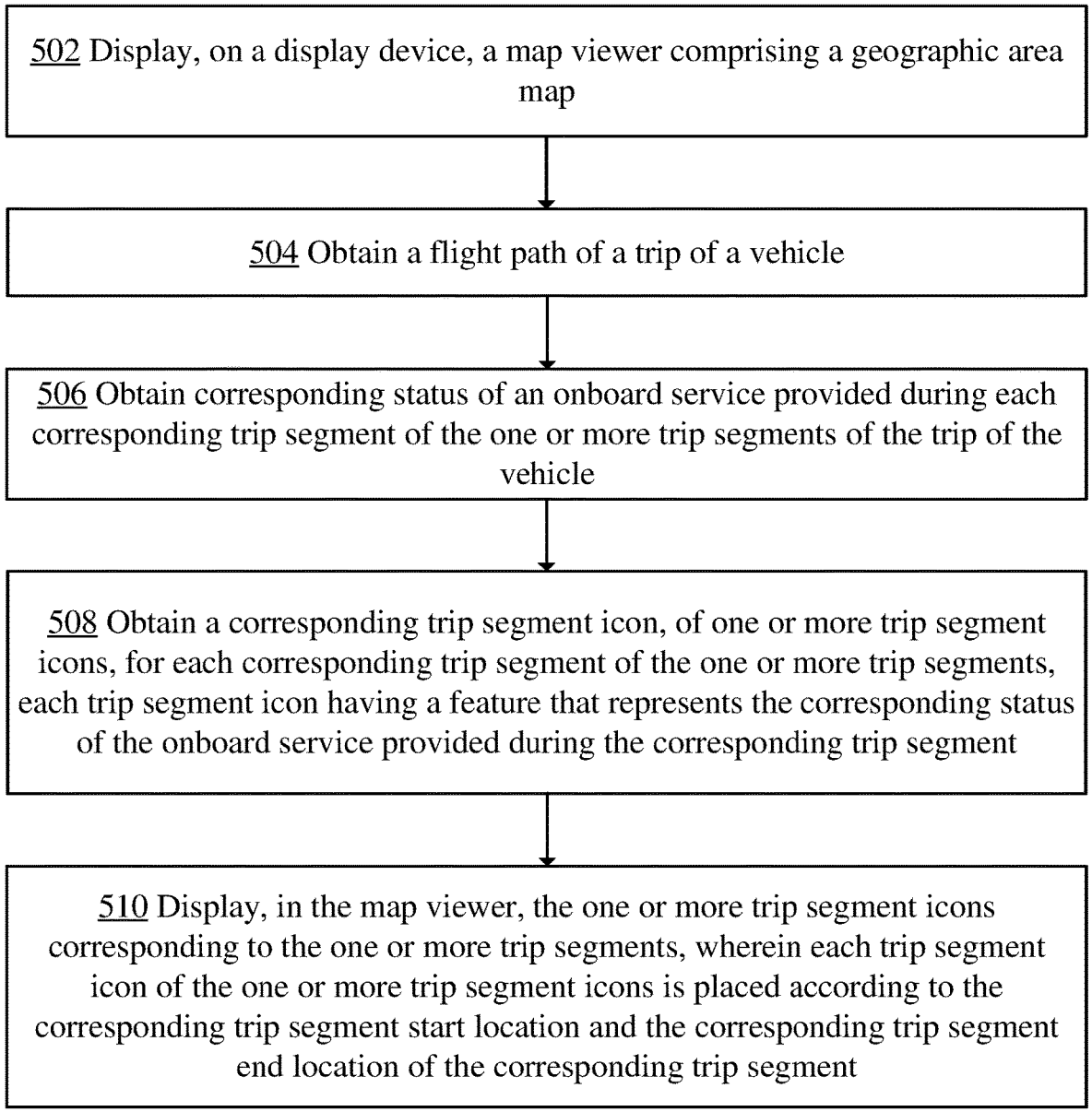
FIG. 5A is an example process for generating and displaying an interactive transport path viewer with service performance dependent features in accordance with one or more embodiments.

FIG. 5A is an example process for generating and displaying an interactive transport path viewer with service performance dependent features in accordance with one or more embodiments. Steps of the process 502-510 may be performed by control circuitry of an apparatus for monitoring a network communications service onboard a vehicle and/or at least in part by an on-ground communications service monitoring server, such as on-ground system 112 of FIG. 1 or on-ground system 200 of FIG. 2, described before.

In some implementations, the apparatus performing some or all steps 502-510 may be part of an on-ground server that is configured to monitor network communication services of multiple vehicles.

In some implementations, an example process may include steps 504-508 performed by, for example, service monitor 202 of on-ground system 220 shown in FIG. 2, and steps 502 and 510 performed by, for example, display device 214 of on-ground system 220 shown in FIG. 2. In some other implementations, steps 502-510 may be performed by other components of on-ground system 200 shown in FIG. 2, or by some components of onboard system 350 shown in FIG. 3.

In step 502, a service monitor causes a display device to display a map viewer comprising a geographic area map. Examples of map viewers are described in FIG. 4A and FIG. 4D-E.

In step 504, the service monitor obtains a flight path of a trip of a vehicle, wherein the flight path comprises one or more trip segments within the geographic area map, each trip segment having a corresponding trip segment start location and a corresponding trip segment end location along the flight path. An example of the path is described in FIG. 4A.

In step 506, the service monitor obtains corresponding status of an onboard service provided during each corresponding trip segment of the one or more trip segments of the trip of the vehicle. The status of an onboard service provided during a trip may correspond to a performance indicator determined for the onboard service provided during the trip.

In step 508, the service monitor obtains a corresponding trip segment icon, of one or more trip segment icons, for each corresponding trip segment of the one or more trip segments, each trip segment icon having a feature that represents the corresponding status of the onboard service provided during the corresponding trip segment.

In step 510, the service monitor causes the display device to display, in the map viewer, the one or more trip segment icons corresponding to the one or more trip segments. Each trip segment icon of the one or more trip segment icons may be placed according to the corresponding trip segment start location and the corresponding trip segment end location of the corresponding trip segment. Examples of trip segment icons are described in FIG. 4A.

6.2. Map Viewer Interactivity

Figure 5B:
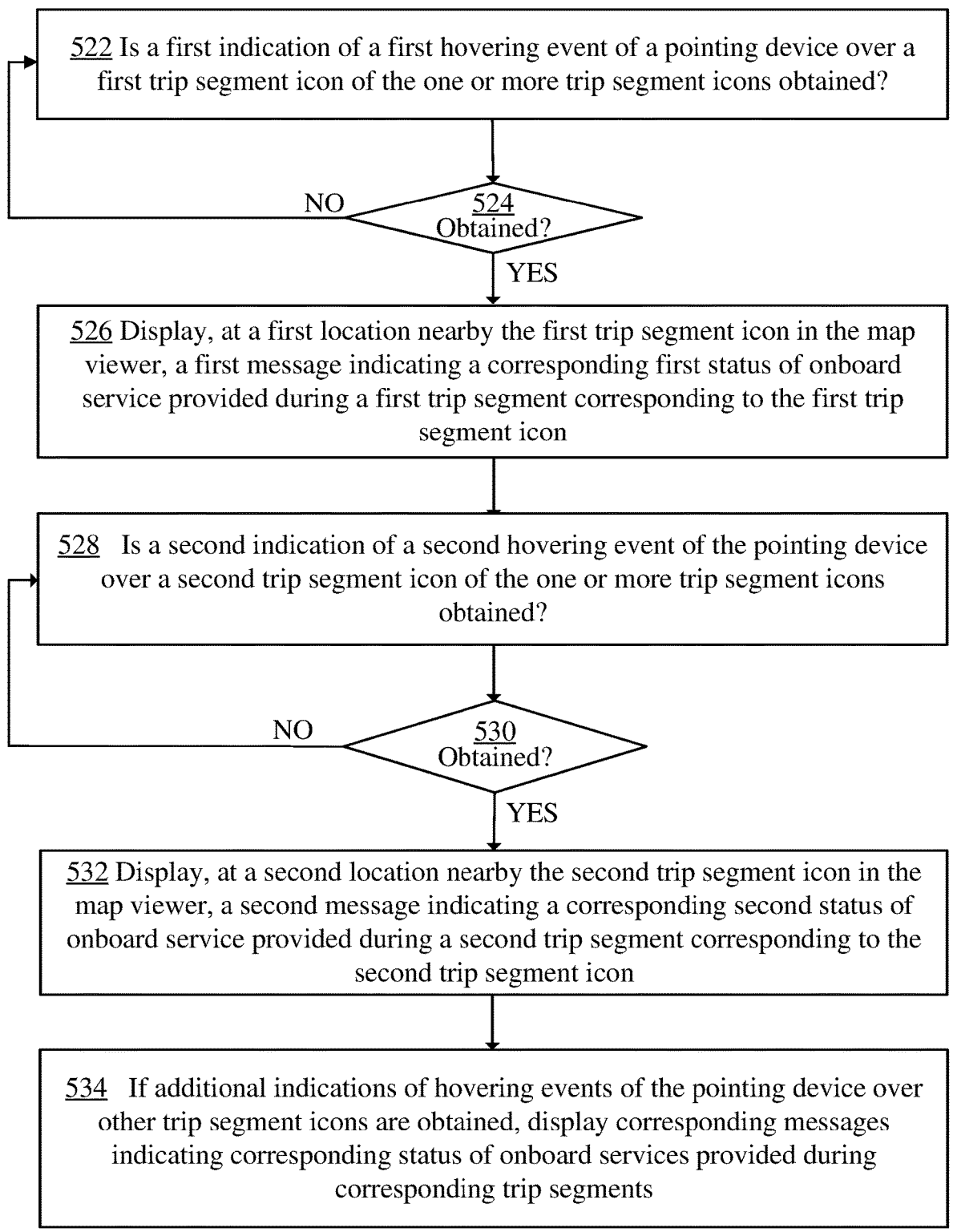
FIG. 5B is an example process for generating and displaying an interactive transport path viewer with service performance dependent features triggered by hovering events in accordance with one or more embodiments.

FIG. 5B is an example process for generating and displaying an interactive transport path viewer with service performance dependent features triggered by hovering events in accordance with one or more embodiments. In some implementations, the apparatus performing the steps 522-534 may be part of an on-ground server that is configured to monitor network communications services of multiple vehicles. In the example below, it is assumed that the steps are performed by a service monitor 202 shown in FIG. 2.

In some implementations, an example process may include steps 522-524, 528-530 and 534 performed by, for example, service monitor 202 of on-ground system 220 shown in FIG. 2, and steps 526 and 532 performed by, for example, display device 214 of on-ground system 220 shown in FIG. 2. In some other implementations, steps 522-534 may be performed by other components of on-ground system 200 shown in FIG. 2, or by some components of onboard system 350 shown in FIG. 3.

In step 522, a service monitor determines whether a first indication of a first hovering event of a pointing device over a first trip segment icon of the one or more trip segment icons is obtained. Examples of hovering events are described in FIG. 4A-B.

If, in step 524, the service monitor determines that a first indication of a first hovering event of a pointing device over a first trip segment icon of the one or more trip segment icons has been obtained, then the service monitor proceeds to step 526. Otherwise, the service monitor proceeds to testing in step 522.

In step 526, the service monitor causes a display device to display, at a first location nearby the first trip segment icon in the map viewer, a first message indicating a corresponding first status of onboard service provided during a first trip segment corresponding to the first trip segment icon. Examples of messages are described in FIG. 4A and FIG. 4D-E.

In step 528, the services monitor determines whether a second indication of a second hovering event of the pointing device over a second trip segment icon of the one or more trip segment icons has been obtained.

If, in step 530, the service monitor determines that a second indication of a second hovering event of a pointing device over a second trip segment icon of the one or more trip segment icons has been obtained, then the service monitor proceeds to step 532. Otherwise, the service monitor proceeds to testing in step 528.

In step 532, the service monitor causes the display device to display, at a second location nearby the second trip segment icon in the map viewer, a second message indicating a corresponding second status of onboard service provided during a second trip segment corresponding to the second trip segment icon. Examples of messages are described in FIG. 4A and FIG. 4D-E.

The process of testing for additional events may be continued. For example, if, in step 534, the service monitor obtains additional indications of hovering events of the pointing device over other trip segment icons, then the service monitor causes the display device to display corresponding messages indicating corresponding status of onboard services provided during corresponding trip segments.

Figure 6A:
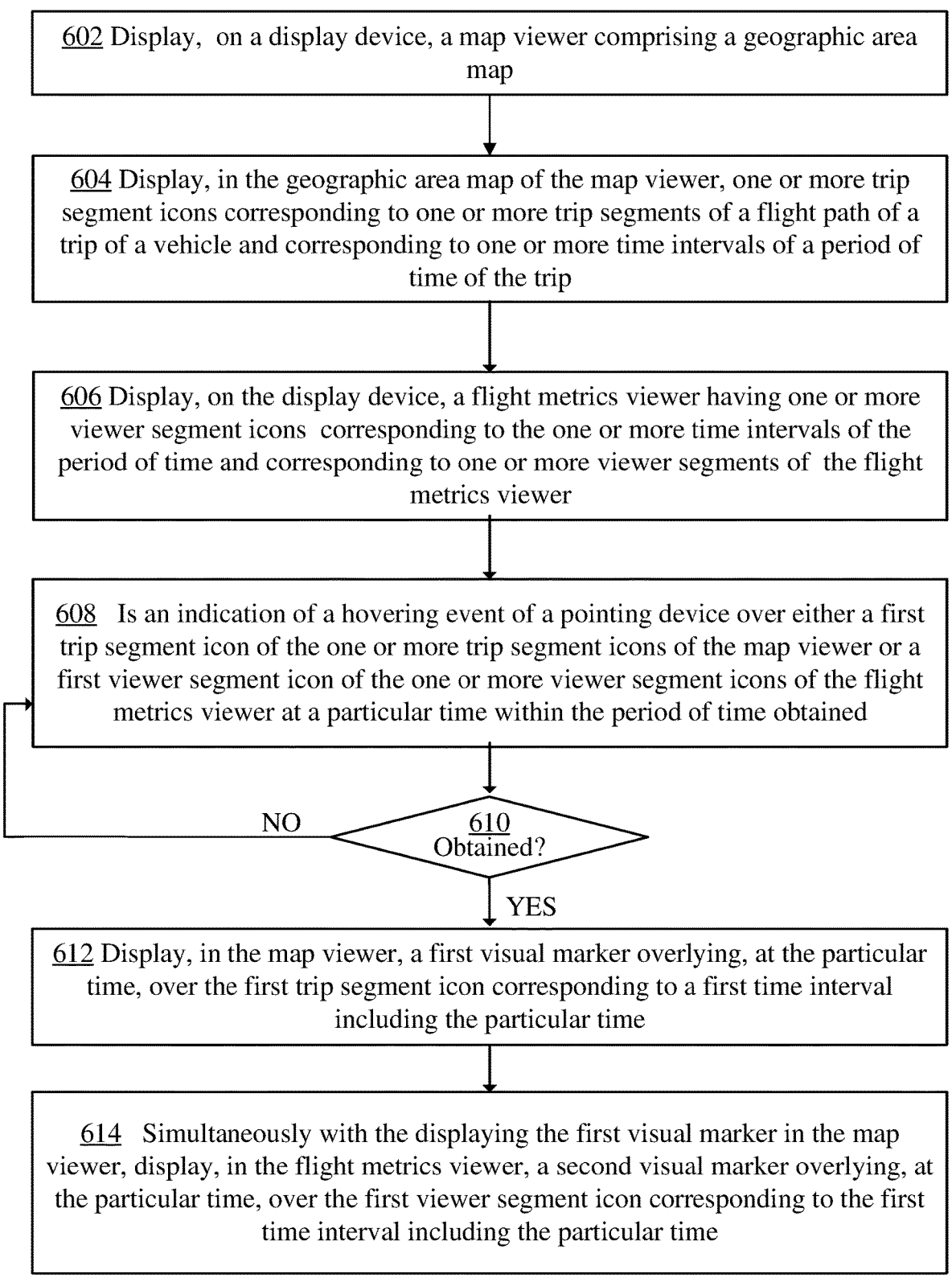
FIG. 6A an example process for generating and displaying one or more metrics flight viewers with service performance dependent features in accordance with one or more embodiments.

6.3. Interactive Flight Metrics Viewers with Service Performance Dependent Features FIG. 6A an example process for generating and displaying one or more metrics flight viewers with service performance dependent features in accordance with one or more embodiments. Steps of the process 602-614 may be performed by control circuitry of an apparatus for monitoring a network communications service onboard a vehicle and/or at least in part by an on-ground communications service monitoring server, such as on-ground system 112 of FIG. 1 or on-ground system 200 of FIG. 2, described in detailed above.

In some implementations, the apparatus performing some or all steps 602-614 may be part of an on-ground server that is configured to monitor network communication services of multiple vehicles. In the example below, it is assumed that the steps are performed by a service monitor 202 shown in FIG. 2.

In some implementations, an example process may include steps 608-610 performed by, for example, service monitor 202 of on-ground system 220 shown in FIG. 2, and steps 602-606 and 612-614 performed by, for example, display device 214 of on-ground system 220 shown in FIG. 2. In some other implementations, steps 602-614 may be performed by other components of on-ground system 200 shown in FIG. 2, or by some components of onboard system 350 shown in FIG. 3.

In step 602, a service monitor causes a display device to display a map viewer comprising a geographic area map. Examples of map viewers are described in FIG. 4D-E.

In step 604, the service monitor service monitor causes the display device to display, in the geographic area map of the map viewer, one or more trip segment icons corresponding to one or more trip segments of a flight path of a trip of a vehicle and corresponding to one or more time intervals of a period of time of the trip. Examples of the path are described in FIG. 4D-E.

In step 606, the service monitor causes the display device to display a flight metrics viewer having one or more viewer segment icons corresponding to the one or more time intervals of the period of time and corresponding to one or more viewer segments of the flight metrics viewer. In the flight metrics viewer, each viewer segment icon has a viewer feature that represents a corresponding status of an onboard service provided during a corresponding time interval of the one or more time intervals of the period of time of the trip. Examples of the viewer segment icons are described in FIG. 4D-E.

In step 608, the service monitor determines whether an indication of a hovering event of a pointing device over either a first trip segment icon of the one or more trip segment icons of the map viewer or a first viewer segment icon of the one or more viewer segment icons of the flight metrics viewer at a particular time within the period of time is obtained. Examples of the hovering events are described in FIG. 4D-E.

If, in step 610, the service monitor determines that an indication of a hovering event of a pointing device over either a first trip segment icon of the one or more trip segment icons of the map viewer or a first viewer segment icon of the one or more viewer segment icons of the flight metrics viewer at a particular time within the period of time has been obtained, then the service monitor performs step 612. Otherwise, the service monitor continues testing in step 608.

In step 612, the service monitor causes the display device to display, in the map viewer, a first visual marker overlying, at the particular time, over the first trip segment icon corresponding to a first time interval including the particular time. Examples of the first marker, visualized as a large, black dot, are described in FIG. 4D-E.

In step 614, the service monitor causes the display device to display in the flight metrics viewer, simultaneously with displaying the first visual marker in the map viewer, a second visual marker overlying, at the particular time, over the first viewer segment icon corresponding to the first time interval including the particular time. Examples of the second visual marker, visualized as a vertical bar, are described in FIG. 4D-E.

6.4. Flight Metrics Viewer Interactivity

Figure 6B:
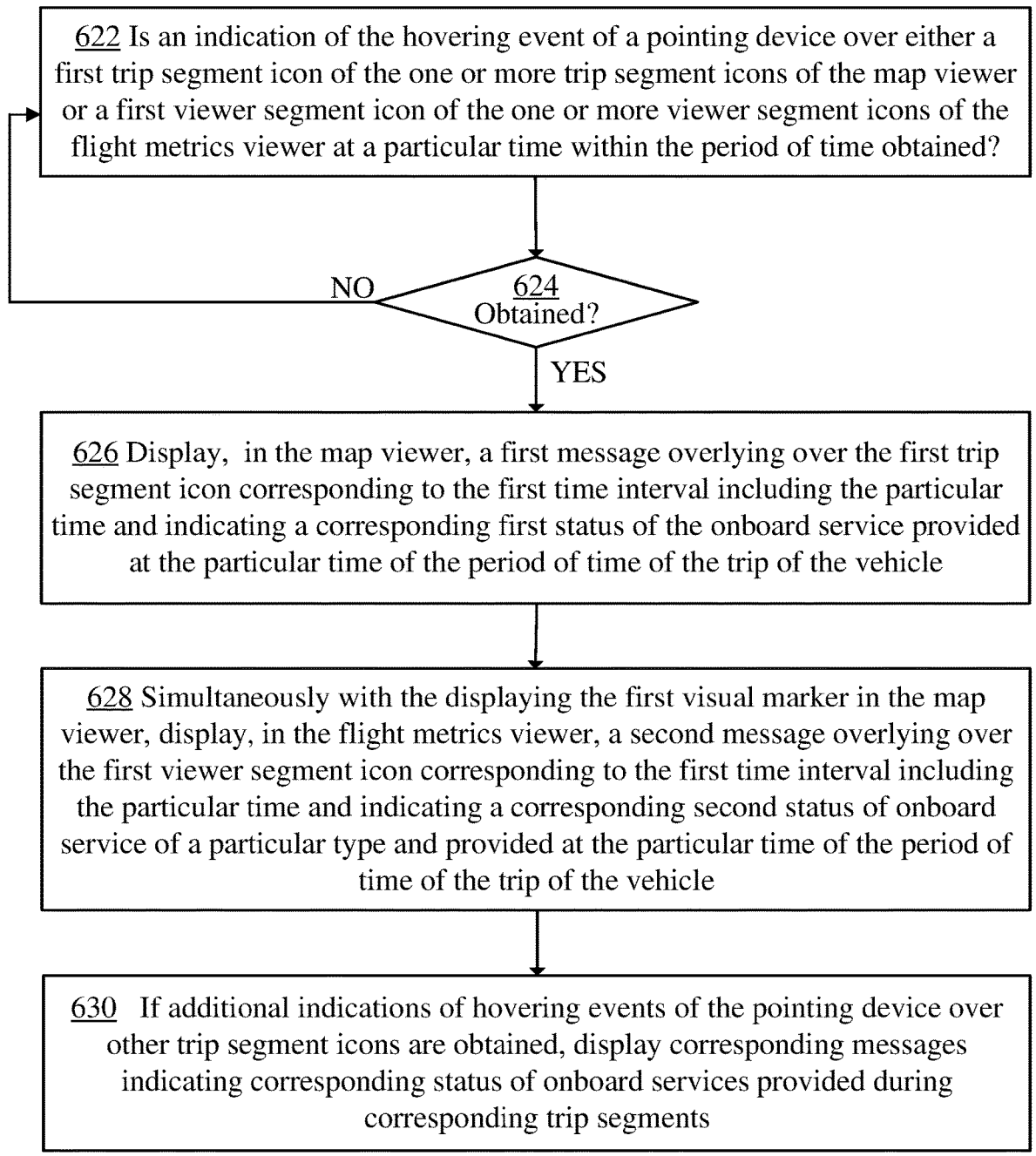
FIG. 6B an example process for generating and displaying one or more metrics flight viewers with service performance dependent features triggered by hovering events in accordance with one or more embodiments.

FIG. 6B an example process for generating and displaying one or more metrics flight viewers with service performance dependent features triggered by hovering events in accordance with one or more embodiments.

In some implementations, the apparatus performing the steps 622-630 may be part of an on-ground server that is configured to monitor network communications services of multiple vehicles. In the example below, it is assumed that the steps are performed by a service monitor 202 shown in FIG. 2.

In step 622, a service monitor determines whether a hovering event of a pointing device over either a first trip segment icon of the one or more trip segment icons of the map viewer or a first viewer segment icon of the one or more viewer segment icons of the flight metrics viewer at a particular time within the period of time is obtained. Examples of the hovering events are described in FIG. 4D-E.

If, in step 624, the service monitor determines that a hovering event of a pointing device over either a first trip segment icon of the one or more trip segment icons of the map viewer or a first viewer segment icon of the one or more viewer segment icons of the flight metrics viewer at a particular time within the period of time has been obtained, then the service monitor proceeds to step 626. Otherwise, the service monitor proceeds to testing in step 622.

In step 626, the service monitor causes a display device to display, in the map viewer, a first message overlying over the first trip segment icon corresponding to the first time interval including the particular time and indicating a corresponding first status of the onboard service provided at the particular time of the period of time of the trip of the vehicle. Examples of the messages are described in FIG. 4D-E.

In step 628, the services monitor causes the display device to display in the flight metrics viewer, simultaneously with displaying the first visual marker in the map viewer, a second message overlying over the first viewer segment icon corresponding to the first time interval including the particular time and indicating a corresponding second status of onboard service of a particular type and provided at the particular time of the period of time of the trip of the vehicle. Examples of the messages are described in FIG. 4D-E.

The process of testing for additional events may be continued. For example, if, in step 630, the service monitor obtains additional indications of hovering events of the pointing device over other trip segment icons, then the service monitor causes the display device to display in the map viewer, simultaneously with displaying the first visual marker in the map viewer, corresponding messages indicating corresponding status of onboard services provided during the corresponding trip segments.

7.0. Hardware Implementation

According to some implementations of the present approach, the techniques described herein are implemented by at least one computer system. The techniques may be implemented in whole or in part using a combination of at least one server computer or other computer systems that are coupled using a network, such as a packet data network. The computer systems may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computer systems may also combine custom hard-wired logic, ASICs, or FPGAs with custom programming to accomplish the described techniques.

The computer systems may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired or program logic to implement the described techniques, one or more virtual computing machines or instances in a data center, or a network of server computers or personal computers.

Figure 7:
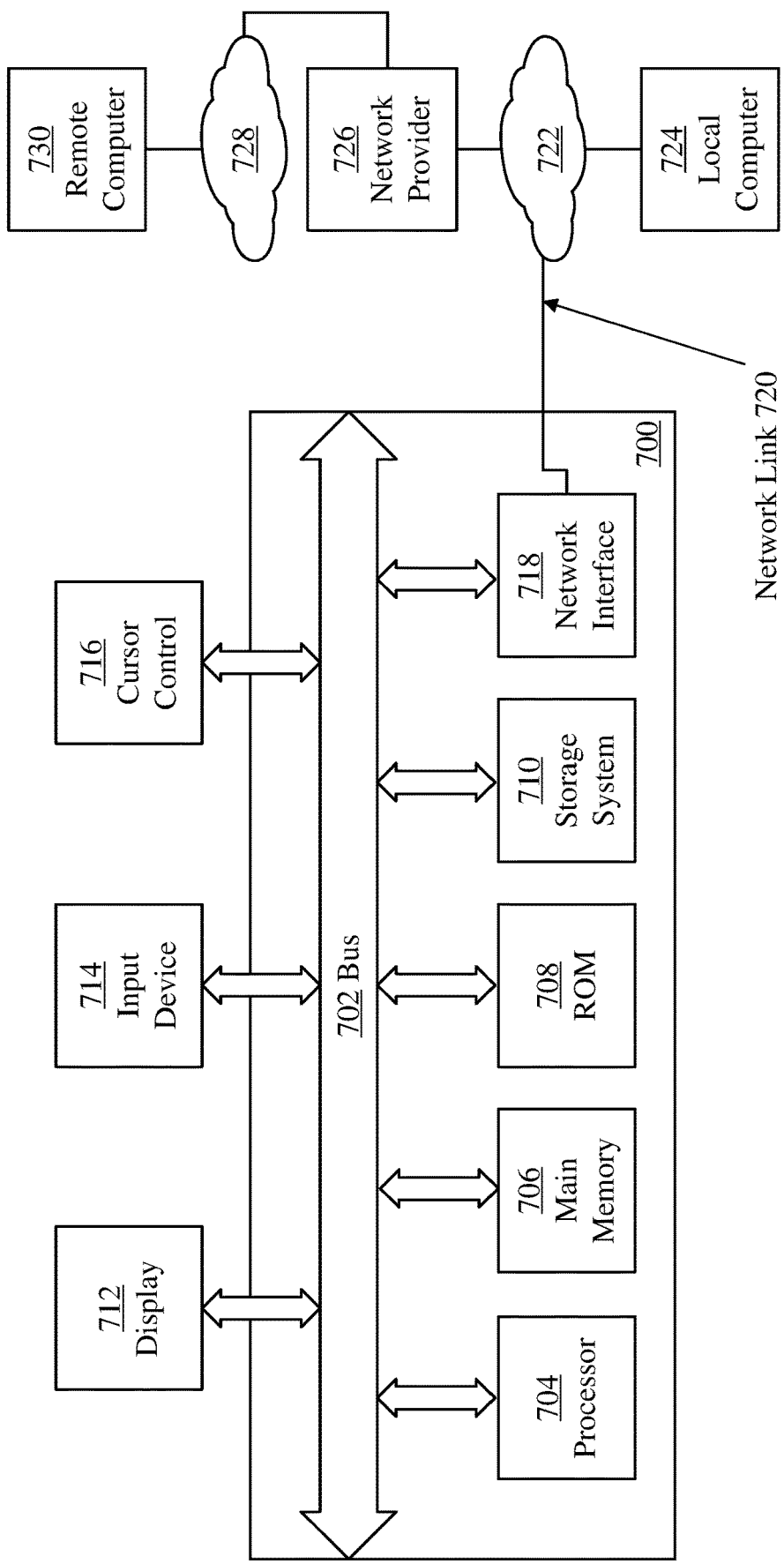
FIG. 7 is a block diagram depicting a computer system upon which some embodiments may be implemented.

FIG. 7 is a block diagram that illustrates an example computer system with which some implementations may be implemented. In the example of FIG. 7, a computer system 700 and instructions for implementing the disclosed technologies in hardware, software, or a combination of hardware and software, are represented schematically, for example as boxes and circles, at the same level of detailed that is commonly used by persons of ordinary skill in the art to which this disclosure pertains for communicating about computer architecture and computer systems implementations.

Computer system 700 includes an input/output (I/O) subsystem 702 which may include a bus or other communication mechanism(s) for communicating information or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file processing instructions to interpret and render files coded using HTML, XML, JPEG, MPEG or PNG; user interface instructions to render or interpret commands for a GUI (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 700 may be coupled via I/O subsystem 702 to at least one output device 712. In some implementations, output device 712 is a digital computer display. Examples of a display that may be used in some implementations include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators, or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, or various types of sensors such as force sensors, motion sensors, heat sensors, accelerometers, gyroscopes, and inertial measurement unit (IMU) sensors or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a GUI on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In some implementations, computer system 700 may comprise an internet of things (IoT) device in which one or more of the output devices 712, input device 714, and control device 716 are omitted. In some implementations, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator, or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware, and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware or program instructions or logic which when loaded and used or executed in combination with the computer system causes or programs the computer system to operate as a special-purpose machine. According to some implementations, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In some implementations, hard-wired circuitry may be used in place of or in combination with software instructions.

The term "storage media" as used herein refers to any non-transitory media that store data or instructions that cause a machine to operate in a specific fashion. Such storage media may comprise non-volatile media or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infrared data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication network, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Communication interface 718 can be based on an interconnect technology used for distributed computing systems, supercomputer systems, and high-performance computing systems. For example, communication interface 718 can be based on OMNI-PATH, INFINIBAND, ARIES, NVLINK, TOFU, or Ethernet.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices or computers that are operated by an Internet Service Provider (ISP) 726. ISP 726 provides data communication services through a world-wide packet data communication network represented as internet 728.

A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or NoSQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In some implementations, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In some implementations, for security and reliability, an operating system may prevent direct communication between independent processes, providing strictly mediated and controlled inter-process communication functionality.

8.0. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for the purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage, or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers, or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be composed of connected logic units, such as gates and flip-flops, and/or may be composed of programmable units, such as programmable gate arrays, application specific integrated circuits, and/or processors. The modules described herein are preferably implemented as software modules but may be represented in hardware and/or firmware. Moreover, although in some implementations a module may be separately compiled, in other embodiments a module may represent a subset of instructions of a separately compiled program and may not have an interface available to other logical program units.

What is claimed is:

1. A method for visualizing an interactive transport path, the method comprising:
    displaying, on a display device, a map viewer comprising a geographic area map;
    displaying, in the geographic area map of the map viewer, one or more trip segment icons corresponding to one or more trip segments of a transport path of a trip of a vehicle and corresponding to one or more time intervals of a period of time of the trip;
    displaying, on the display device, a transport metrics viewer having one or more viewer segment icons corresponding to the one or more time intervals of the period of time and corresponding to one or more viewer segments of the transport metrics viewer, each viewer segment icon having a viewer feature that represents a corresponding status of an onboard service provided during a corresponding time interval of the one or more time intervals of the period of time of the trip the corresponding status being generated based on metrics data regarding the onboard services provided during the trip of the vehicle;
    obtaining an indication of a hovering event of a pointing device over either a first trip segment icon of the one or more trip segment icons of the map viewer or a first viewer segment icon of the one or more viewer segment icons of the transport metrics viewer at a particular time within the period of time;
    in response to obtaining the indication of the hovering event:
        displaying, in the map viewer, a first visual marker overlying, at the particular time, over the first trip segment icon corresponding to a first time interval including the particular time; and
        simultaneously with displaying the first visual marker in the map viewer, display, in the transport metrics viewer, a second visual marker overlying, at the particular time, over the first viewer segment icon corresponding to the first time interval, including the particular time.

2. The method of claim 1, further comprising:
    in response to obtaining the indication of the hovering event: displaying, in the map viewer, a first message overlying over the first trip segment icon corresponding to the first time interval including the particular time and indicating a corresponding first status of the onboard service provided at the particular time of the period of time of the trip of the vehicle; and
    simultaneously with displaying the first visual marker in the map viewer, displaying, in the transport metrics viewer, a second message overlying over the first viewer segment icon corresponding to the first time interval including the particular time and indicating a corresponding second status of onboard service of a particular type and provided at the particular time of the period of time of the trip of the vehicle.

3. The method of claim 2, wherein the corresponding first status of the onboard service provided at the particular time of the period of time of the trip of the vehicle includes aggregated information about the onboard service provided at the particular time of the period of time of the trip of the vehicle.

4. The method of claim 2, wherein the corresponding second status of onboard service of a particular type and provided at the particular time of the period of time of the trip of the vehicle includes aggregated information about the onboard service of a particular service type provided at the particular time of the period of time of the trip of the vehicle.

5. The method of claim 3, wherein the aggregated information about the onboard service provided during the first time interval includes aggregated information about one or more of: an inflight entertainment (IFE) service, an inflight connectivity (IFC) service, an IFE session service, a Wi-Fi connectivity service, a Wi-Fi session service, a TV service, a TV session service, a data session service, a promotional session service, an email service, or a texting service.

6. The method of claim 1, wherein each of the first visual marker and the second visual marker has one or more features representing one or more of: a shape, a color, a pattern, or a shade.

7. The method of claim 1, wherein the first message further includes time information about the first time interval and the particular time;
    wherein the one or more trip segment icons depicted in the map viewer are color-coded using one or more colors that correspond to one or more corresponding ranges of quality of onboard communications services provided during one or more corresponding trip segments of the one or more trip segments of the trip;
    wherein the one or more viewer segment icons depicted in the transport metrics viewer are color-coded using the one or more colors that correspond to the one or more corresponding ranges of quality of onboard communications services provided during the one or more corresponding trip segments of the one or more trip segments of the trip; and
    wherein a certain trip segment icon, of the one or more trip segment icons depicted in the map viewer, is depicted using the same color as a corresponding viewer segment icon of the one or more viewer segment icons of the transport metrics viewer.

8. The method of claim 1, wherein the transport metrics viewer comprises one or more transport metrics sub-viewers, each transport metrics sub-viewer having one or more sub-viewer segment icons corresponding to the one or more time intervals of the period of time and corresponding to the one or more viewer segments of the transport metrics viewer, each sub-viewer segment icon having a sub-viewer feature that represents a corresponding status of an onboard service of a sub-viewer type and provided during a corresponding time interval of the one or more time intervals of the trip.

9. The method of claim 1, further comprising:
in response to determining that the second visual marker is overlaid over a particular viewer segment icon depicted in the transport metrics viewer:
causing the display device to increase the brightness of a color used to depict the particular viewer segment icon, and to decrease the brightness of colors used to depict remaining viewer segment icons of the one or more viewer segment icons depicted in the transport metrics viewer.

10. The method of claim 1, wherein the first visual marker is color-coded using the same color that is used to color-code the first trip segment icon of the one or more trip segment icons of the transport path depicted in the map viewer, and to color-code the first viewer segment icon of one or more viewer segment icons of the transport metrics viewer.

11. The method of claim 1, further comprising: obtaining an indication of a second hovering event of the pointing device over either a third trip segment icon of the one or more trip segment icons of the map viewer or a third viewer segment icon of the one or more viewer segment icons of the transport metrics viewer at a third time within the period of time:
in response to obtaining the indication of the second hovering event:
removing all previously displayed markers from the map viewer and the transport metrics viewer;
displaying, in the map viewer, a third visual marker overlying, at the third time, over the third trip segment icon corresponding to a third time interval including the third time; and
simultaneously with displaying the third visual marker in the map viewer, displaying, in the transport metrics viewer, a fourth visual marker overlying, at the third time, over the third viewer segment icon corresponding to the third time interval including the third time.

12. The method of claim 1, further comprising: determining, based on quality of onboard communications services delivered by the vehicle during a first trip segment corresponding to the first trip segment icon, whether an outage event occurred during at least the first trip segment of the trip; and
in response to determining that the outage event occurred during at least the first trip segment of the trip:
determining a time interval during which the outage event occurred; and
including information about the outage event and the time interval of the outage event in the first message.

13. The method of claim 12, wherein the outage event comprises one of an out-of-coverage, blockage, transmit inhibit, and no aircraft data bus.

14. An apparatus for visualizing an interactive transport path with service performance dependent features, the apparatus comprising: a processor, memory in electronic communications with the processor; and instructions stored in the memory and executable by the processor to cause the processor to perform:
displaying, on a display device, a map viewer comprising a geographic area map;
displaying, in the geographic area map of the map viewer, one or more trip segment icons corresponding to one or more trip segments of a transport path of a trip of a vehicle and corresponding to one or more time intervals of a period of time of the trip;
displaying, on the display device, a transport metrics viewer having one or more viewer segment icons corresponding to the one or more time intervals of the period of time and corresponding to one or more viewer segments of the transport metrics viewer, each viewer segment icon having a viewer feature that represents a corresponding status of an onboard service provided during a corresponding time interval of the one or more time intervals of the period of time of the trip, the corresponding status being generated based on metrics data regarding the onboard services provided during the trip of the vehicle;
obtaining an indication of a hovering event of a pointing device over either a first trip segment icon of the one or more trip segment icons of the map viewer or a first viewer segment icon of the one or more viewer segment icons of the transport metrics viewer at a particular time within the period of time;
in response to obtaining the indication of the hovering event:
displaying, in the map viewer, a first visual marker overlying, at the particular time, over the first trip segment icon corresponding to a first time interval including the particular time; and
simultaneously with displaying the first visual marker in the map viewer, displaying, in the transport metrics viewer, a second visual marker overlying, at the particular time, over the first viewer segment icon corresponding to the first time interval including the particular time.

15. The apparatus of claim 14, further comprising:
in response to obtaining the indication of the hovering event: displaying, in the map viewer, a first message overlying over the first trip segment icon corresponding to the first time interval including the particular time and indicating a corresponding first status of the onboard service provided at the particular time of the period of time of the trip of the vehicle; and
simultaneously with displaying the first visual marker in the map viewer, displaying, in the transport metrics viewer, a second message overlying over the first viewer segment icon corresponding to the first time interval including the particular time and indicating a corresponding second status of onboard service of a particular type and provided at the particular time of the period of time of the trip of the vehicle.

16. The apparatus of claim 15, wherein the corresponding first status of the onboard service provided at the particular time of the period of time of the trip of the vehicle includes aggregated information about the onboard service provided at the particular time of the period of time of the trip of the vehicle.

17. The apparatus of claim 15, wherein the corresponding second status of onboard service of a particular type and provided at the particular time of the period of time of the trip of the vehicle includes aggregated information about the onboard service of a particular service type provided at the particular time of the period of time of the trip of the vehicle.

18. The apparatus of claim 16, wherein the aggregated information about the onboard service provided during the first time interval includes aggregated information about one or more of: an inflight entertainment (IFE) service, an inflight connectivity (IFC) service, an IFE session service, a Wi-Fi connectivity service, a Wi-Fi session service, a TV service, a TV session service, a data session service, a promotional session service, an email service, or a texting service.

19. The apparatus of claim 14, wherein each of the first visual marker and the second visual marker has one or more features representing one or more of: a shape, a color, a pattern, or a shade.

20. The apparatus of claim 14, wherein the first message further includes time information about the first time interval and the particular time;
  wherein the one or more trip segment icons depicted in the map viewer are color-coded using one or more colors that correspond to one or more corresponding ranges of quality of onboard communications services provided during one or more corresponding trip segments of the one or more trip segments of the trip;
  wherein the one or more viewer segment icons depicted in the transport metrics viewer are color-coded using the one or more colors that correspond to the one or more corresponding ranges of quality of onboard communications services provided during the one or more corresponding trip segments of the one or more trip segments of the trip; and
  wherein a certain trip segment icon, of the one or more trip segment icons depicted in the map viewer, is depicted using the same color as a corresponding viewer segment icon of the one or more viewer segment icons of the transport metrics viewer.

21. The apparatus of claim 14, wherein the transport metrics viewer comprises one or more transport metrics sub-viewers, each transport metrics sub-viewer having one or more sub-viewer segment icons corresponding to the one or more time intervals of the period of time and corresponding to the one or more viewer segments of the transport metrics viewer, each sub-viewer segment icon having a sub-viewer feature that represents a corresponding status of an onboard service of a sub-viewer type and provided during a corresponding time interval of the one or more time intervals of the trip.

22. The apparatus of claim 14, storing additional instructions for: in response to determining that the second visual marker is overlaid over a particular viewer segment icon depicted in the transport metrics viewer, causing the display device to increase a brightness of a color used to depict the particular viewer segment icon, and to decrease a brightness of colors used to depict remaining viewer segment icons of the one or more viewer segment icons depicted in the transport metrics viewer.

23. The apparatus of claim 14, wherein the first visual marker is color-coded using the same color that is used to color-code the first trip segment icon of the one or more trip segment icons of the transport path depicted in the map viewer, and to color-code the first viewer segment icon of one or more viewer segment icons of the transport metrics viewer.

24. The apparatus of claim 14, storing additional instructions for: obtaining an indication of a second hovering event of the pointing device over either a third trip segment icon of the one or more trip segment icons of the map viewer or a third viewer segment icon of the one or more viewer segment icons of the transport metrics viewer at a third time within the period of time;
  in response to obtaining the indication of the second hovering event:
    removing all previously displayed markers from the map viewer and the transport metrics viewer;
    displaying, in the map viewer, a third visual marker overlying, at the third time, over the third trip segment icon corresponding to a third time interval including the third time; and
    simultaneously with displaying the third visual marker in the map viewer, displaying, in the transport metrics viewer, a fourth visual marker overlying, at the third time, over the third viewer segment icon corresponding to the third time interval including the third time.

25. The apparatus of claim 14, storing additional instructions for: determining, based on quality of onboard communications services delivered by the vehicle during a first trip segment corresponding to the first trip segment icon, whether an outage event occurred during at least the first trip segment of the trip;
  in response to determining that the outage event occurred during at least the first trip segment of the trip:
    determining a time interval during which the outage event occurred; and
    including information about the outage event and the time interval of the outage event in the first message.

26. The apparatus of claim 25, wherein the outage event comprises one of an out-of-coverage, blockage, transmit inhibit, and no aircraft data bus.

27. One or more non-transitory computer-readable storage media storing computer code for visualizing an interactive transport path, the computer code comprising instructions which, when executed by a processor, cause the processor to perform:
  displaying, on a display device, a map viewer comprising a geographic area map;
  displaying, in the geographic area map of the map viewer, one or more trip segment icons corresponding to one or more trip segments of a transport path of a trip of a vehicle and corresponding to one or more time intervals of a period of time of the trip;
  displaying, on the display device, a transport metrics viewer having one or more viewer segment icons corresponding to the one or more time intervals of the period of time and corresponding to one or more viewer segments of the transport metrics viewer, each viewer segment icon having a viewer feature that represents a corresponding status of an onboard service provided during a corresponding time interval of the one or more time intervals of the period of time of the trip, the corresponding status being generated based on metrics data regarding the onboard services provided during the trip of the vehicle;
  obtaining an indication of a hovering event of a pointing device over either a first trip segment icon of the one or more trip segment icons of the map viewer or a first viewer segment icon of the one or more viewer segment icons of the transport metrics viewer at a particular time within the period of time;
  in response to obtaining the indication of the hovering event:
    displaying, in the map viewer, a first visual marker overlying, at the particular time, over the first trip segment icon corresponding to a first time interval including the particular time; and simultaneously with displaying the first visual marker in the map viewer, displaying, in the transport metrics viewer, a second visual marker overlying, at the particular time, over the first viewer segment icon corresponding to the first time interval including the particular time.

28. The one or more non-transitory computer-readable storage media of claim 27, storing additional instructions for: in response to obtaining the indication of the hovering event, displaying, in the map viewer, a first message overlying over the first trip segment icon corresponding to the first time interval including the particular time and indicating a corresponding first status of the onboard service provided at the particular time of the period of time of the trip of the vehicle; and simultaneously with displaying the first visual marker in the map viewer, displaying, in the transport metrics viewer, a second message overlying over the first viewer segment icon corresponding to the first time interval including the particular time and indicating a corresponding second status of onboard service of a particular type and provided at the particular time of the period of time of the trip of the vehicle.

29. The one or more non-transitory computer-readable storage media of claim 28, wherein the corresponding first status of the onboard service provided at the particular time of the period of time of the trip of the vehicle includes aggregated information about the onboard service provided at the particular time of the period of time of the trip of the vehicle.

30. The one or more non-transitory computer-readable storage media of claim 28, wherein the corresponding second status of onboard service of a particular type and provided at the particular time of the period of time of the trip of the vehicle includes aggregated information about the onboard service of a particular service type provided at the particular time of the period of time of the trip of the vehicle.

31. The one or more non-transitory computer-readable storage media of claim 29, wherein the aggregated information about the onboard service provided during the first time interval includes aggregated information about one or more of: an inflight entertainment (IFE) service, an inflight connectivity (IFC) service, an IFE session service, a Wi-Fi connectivity service, a Wi-Fi session service, a TV service, a TV session service, a data session service, a promotional session service, an email service, or a texting service.

32. The one or more non-transitory computer-readable storage media of claim 27, wherein each of the first visual marker and the second visual marker has one or more features representing one or more of: a shape, a color, a pattern, or a shade.

33. The one or more non-transitory computer-readable storage media of claim 27, wherein the first message further includes time information about the first time interval and the particular time;

wherein the one or more trip segment icons depicted in the map viewer are color-coded using one or more colors that correspond to one or more corresponding ranges of quality of onboard communications services provided during one or more corresponding trip segments of the one or more trip segments of the trip;

wherein the one or more viewer segment icons depicted in the transport metrics viewer are color-coded using the one or more colors that correspond to the one or more corresponding ranges of quality of onboard communications services provided during the one or more corresponding trip segments of the one or more trip segments of the trip; and wherein a certain trip segment icon, of the one or more trip segment icons depicted in the map viewer, is depicted using the same color as a corresponding viewer segment icon of the one or more viewer segment icons of the transport metrics viewer.

34. The one or more non-transitory computer-readable storage media of claim 27, wherein the transport metrics viewer comprises one or more transport metrics sub-viewers, each transport metrics sub-viewer having one or more sub-viewer segment icons corresponding to the one or more time intervals of the period of time and corresponding to the one or more viewer segments of the transport metrics viewer, each sub-viewer segment icon having a sub-viewer feature that represents a corresponding status of an onboard service of a sub-viewer type and provided during a corresponding time interval of the one or more time intervals of the trip.

35. The one or more non-transitory computer-readable storage media of claim 27, storing additional instructions for:

in response to determining that the second visual marker is overlaid over a particular viewer segment icon depicted in the transport metrics viewer; and causing the display device to increase a brightness of a color used to depict the particular viewer segment icon, and to decrease a brightness of colors used to depict remaining viewer segment icons of the one or more viewer segment icons depicted in the transport metrics viewer.

36. The one or more non-transitory computer-readable storage media of claim 27, wherein the first visual marker is color-coded using the same color that is used to color-code the first trip segment icon of the one or more trip segment icons of the transport path depicted in the map viewer, and to color-code the first viewer segment icon of one or more viewer segment icons of the transport metrics viewer.

37. The one or more non-transitory computer-readable storage media of claim 27, storing additional instructions for:

obtaining an indication of a second hovering event of the pointing device over either a third trip segment icon of the one or more trip segment icons of the map viewer or a third viewer segment icon of the one or more viewer segment icons of the transport metrics viewer at a third time within the period of time; and in response to obtaining the indication of the second hovering event:

removing all previously displayed markers from the map viewer and the transport metrics viewer;

displaying, in the map viewer, a third visual marker overlying, at the third time, over the third trip segment icon corresponding to a third time interval including the third time; and simultaneously with displaying the third visual marker in the map viewer, displaying, in the transport metrics viewer, a fourth visual marker overlying, at the third time, over the third viewer segment icon corresponding to the third time interval including the third time.

38. The one or more non-transitory computer-readable storage media of claim 27, storing additional instructions for:

determining, based on quality of onboard communications services delivered by the vehicle during a first trip segment corresponding to the first trip segment icon, whether an outage event occurred during at least the first trip segment of the trip;

in response to determining that the outage event occurred during at least the first trip segment of the trip:

determining a time interval during which the outage event occurred; and including information about the outage event and the time interval of the outage event in the first message.

39. The one or more non-transitory computer-readable storage media of claim 38, wherein the outage event comprises one of an out-of-coverage, blockage, transmit inhibit, and no aircraft data bus.

* * * * *